US008403565B2

United States Patent
Hori et al.

(10) Patent No.: US 8,403,565 B2
(45) Date of Patent: Mar. 26, 2013

(54) FLUID DYNAMIC BEARING DEVICE

(75) Inventors: Masaharu Hori, Kuwana (JP);
Yoshiharu Inazuka, Kuwana (JP)

(73) Assignee: NTN Corporation, Osaka-shi (JP)

( * ) Notice: Subject to any disclaimer, the term of this patent is extended or adjusted under 35 U.S.C. 154(b) by 1151 days.

(21) Appl. No.: 12/293,514

(22) PCT Filed: Mar. 13, 2007

(86) PCT No.: PCT/JP2007/054903
§ 371 (c)(1),
(2), (4) Date: Sep. 18, 2008

(87) PCT Pub. No.: WO2007/108361
PCT Pub. Date: Sep. 27, 2007

(65) Prior Publication Data
US 2009/0279819 A1 Nov. 12, 2009

(30) Foreign Application Priority Data

Mar. 20, 2006 (JP) .................................. 2006-077293
Mar. 23, 2006 (JP) .................................. 2006-081270
Nov. 20, 2006 (JP) .................................. 2006-313086

(51) Int. Cl.
*F16C 32/06* (2006.01)
(52) U.S. Cl. ......... 384/107; 384/100; 384/119; 384/124
(58) Field of Classification Search .................. 384/100, 384/107, 112, 119, 121, 123–124
See application file for complete search history.

(56) References Cited

U.S. PATENT DOCUMENTS

| | | | |
|---|---|---|---|
| 5,357,163 A | | 10/1994 | Minakuchi et al. |
| 5,423,612 A | * | 6/1995 | Zang et al. .................. 384/119 |
| 5,789,836 A | * | 8/1998 | Hayakawa .................. 384/107 |
| 7,265,467 B2 | * | 9/2007 | Sumi .............................. 310/90 |
| 2004/0017954 A1 | * | 1/2004 | Komori et al. ............... 384/100 |
| 2005/0254736 A1 | * | 11/2005 | Shishido et al. ............. 384/107 |
| 2005/0274018 A1 | * | 12/2005 | Gomyo et al. ............. 29/898.02 |
| 2006/0029313 A1 | | 2/2006 | Hamada et al. |

(Continued)

FOREIGN PATENT DOCUMENTS

CN 1614249 A 5/2005
JP 5-312213 A 11/1993

(Continued)

OTHER PUBLICATIONS

International Search Report of PCT/JP2007/054903, date of mailing Jun. 19, 2007.

(Continued)

*Primary Examiner* — Marcus Charles
(74) *Attorney, Agent, or Firm* — Westerman, Hattori, Daniels & Adrian, LLP

(57) ABSTRACT

An oil film is formed in a radial bearing clearance of a first radial bearing portion (R1) and a second radial bearing portion (R2) so as to rotatably support a shaft member (2). A bearing sleeve (8) and the shaft member (2) are accommodated in a housing (7), and the housing (7) has an inner space filled with a lubricant oil and has an opening sealed by a seal member (9). A first seal space (S1) is formed by means of an inner peripheral surface (9a2) of the seal member (9). The housing (7) and the seal member (9) are formed through injection molding of a resin.

13 Claims, 13 Drawing Sheets

U.S. PATENT DOCUMENTS

2006/0097592 A1 * 5/2006 Sumi .............................. 310/90
2008/0218019 A1   9/2008 Sumi

FOREIGN PATENT DOCUMENTS

| JP | 08149748 A | * | 6/1996 |
| JP | 08331796 A | * | 12/1996 |
| JP | 1003070732 A | * | 2/1998 |
| JP | 11-273236 A | | 10/1999 |
| JP | 2001-140866 A | | 5/2001 |
| JP | 2003-172336 A | | 6/2003 |
| JP | 2003-232353 A | | 8/2003 |
| JP | 2003-239974 A | | 8/2003 |
| JP | 2005-155912 A | | 6/2005 |
| JP | 2005-163858 A | | 6/2005 |
| JP | 2005-163903 A | | 6/2005 |
| JP | 2005-265119 A | | 9/2005 |
| JP | 2005257073 A | * | 9/2005 |
| JP | 2005-282779 A | | 10/2005 |
| JP | 2006-057708 A | | 3/2006 |
| JP | 2006064041 A | * | 3/2006 |
| JP | 2006161967 A | * | 6/2006 |

OTHER PUBLICATIONS

Japanese Office Action dated Apr. 13, 2012, issued in corresponding Japanese Patent Application No. 2006-313086.
Chinese Office Action dated Nov. 13, 2009, issued in corresponding Chinese Patent Application No. 200780009490.
Japanese Office Action dated Nov. 14, 2012, issued in corresponding Japanese patent application No. 2011-278440.

* cited by examiner

FLUID DYNAMIC BEARING DEVICE

CROSS REFERENCE TO RELATED APPLICATIONS

This is a 371 of International Application No. PCT/JP2007/054903, filed on Mar. 13, 2007, which claims the benefit of priority from the prior Japanese Patent Application Nos. 2006-077293, filed on Mar. 20, 2006, 2006-081270 filed on Mar. 23, 2006, and 2006-313086 filed on Nov. 20, 2006, the entire contents of which are incorporated herein by references.

TECHNICAL FIELD

The present invention relates to a fluid dynamic bearing device for rotatably supporting a shaft member through an oil film formed in a bearing clearance.

BACKGROUND ART

A fluid dynamic bearing device rotatably supports a shaft member through an oil film formed in a bearing clearance. The fluid dynamic bearing device is one having characteristics such as high-speed rotation operation, excellent rotational accuracy, and quietness. In recent years, by taking advantage of those characteristics, the fluid dynamic bearing device is suitably used as a bearing device for a motor to be mounted to various electrical apparatuses such as information equipment. Specifically, as a bearing device for a motor, the fluid dynamic bearing device can be suitably used in the following: a spindle motor for an information apparatus such as a magnetic disk drive such as an HDD, an optical disk drive for a CD-ROM, CD-R/RW, DVD-ROM/RAM, or the like, or a magneto-optical disk drive for an MD, MO, or the like; a polygon scanner motor of a laser beam printer (LBP); or a fan motor.

As a fluid dynamic bearing device of this type, one having a structure is well-known in which a bearing sleeve made of a sintered metal is fixed along an inner periphery of a housing of a bottomed cylindrical shape, and an axial member is inserted along an inner periphery of the bearing sleeve so that a radial bearing clearance is formed between an outer peripheral surface of the axial member and an inner peripheral surface of the bearing sleeve. In the housing, a seal member is disposed adjacently to the bearing sleeve in an axial direction thereof, and a seal space is formed in which an lubricant oil is filled between an inner peripheral surface of the seal member and an outer peripheral surface of the axial member. As a result, leakage of the lubricant oil filled inside the housing is prevented owing to a capillary effect.

Well-known example of the housing and the seal member includes a machined product of a free-cutting brass (refer to Patent Document 1, for example).

Further, as a fluid dynamic bearing device of this type, one illustrated in FIG. 16 is well-known. In a fluid dynamic bearing device 70 illustrated in the figure, a bearing sleeve 78 is fixed along an inner periphery of a housing 77, and an axial member 72 is inserted along an inner periphery of the bearing sleeve 78 so that radial bearing portions 75 and 76 are provided in a radial bearing clearance formed between an outer peripheral surface of the axial member 72 and an inner peripheral surface of the bearing sleeve 78. Further, an annular seal member 79 is fixed along an inner periphery of an opening of the housing 77, and a seal space is formed between the seal member 79 and the axial member 72. For cost reduction of the fluid dynamic bearing device, it is desirable that the number of components be as small as possible, and the configurations of the members be as simple as possible. Accordingly, in the fluid dynamic bearing device 70 illustrated in the figure, the housing 77 is formed in a bottomed cylindrical shape (cup shape) in which a side portion and a bottom portion thereof are formed integrally with each other, and an inner periphery of the side portion is formed in a cylindrical surface straight over the entire axial length (refer to Patent Documents 2 and 3, for example).

Still further, as examples of the fluid dynamic bearing device of this type, Patent Document 4 describes one in which a housing made of a resin is used, and Patent Document 5 describes one in which a bearing sleeve made of a resin is used. As described above, employment of the housing and bearing sleeve made of a resin achieves the reduction in material cost.

Patent Document 1: JP 2003-172336 A
Patent Document 2: JP 2003-232353 A
Patent Document 3: JP 2003-239974 A
Patent Document 4: JP 2005-282779 A
Patent Document 5: JP 2005-163858 A

DISCLOSURE OF THE INVENTION

Problems to be Solved by the Invention

In recent years, regarding an HDD device, for example, there is such a trend that number of mounted magnetic disks is increased (multiple lamination) in accordance with an increase in capacity. In this context, owing to the increase in weight as described above, a further increase in bearing stiffness, in particular, an increase in bearing stiffness (moment stiffness) with respect to a moment load is required for a fluid dynamic bearing device for supporting a shaft. Meanwhile, a demand for cost reduction remains strong as well. Therefore, the demand is not satisfied only with a mere increase in bearing stiffness, and hence it is also important to consider how to avoid a sharp increase in cost thus involved.

Further, in order to increase a pulling resistance (unmating force) of the shaft member so as to stably maintain a rotational accuracy irrespective of the increase in weight due to the multiple lamination of the disks, it is necessary to further increase a fixing strength of the bearing sleeve with respect to the housing. Note that, various means have been proposed as fixing means for the bearing sleeve with respect to the housing. However, actually, simple means such as press-fitting or bonding are adopted in many cases.

In order to increase a fixing strength in press-fitting, it is necessary to set exposed thread to large. However, when the exposed thread is set to large, a configuration of an inner peripheral surface of the bearing sleeve is deteriorated. As a result, there arises a risk of deteriorating the bearing performance. Therefore, it is not easy to increase a fixing strength therebetween only with press-fitting.

Meanwhile, when bonded to be fixed to each other, it is common that both the members are slid to each other in a state where an adhesive is applied in advance on the inner peripheral surface of the housing or the outer peripheral surface of the bearing sleeve. However, when the housing and the bearing sleeve are relatively slid to each other, the adhesive moves toward the bottom portion side (thrust bearing portion side) of the housing. As a result, there arises a risk of a shortage of the adhesive to be interposed between the inner peripheral surface of the housing and the outer peripheral surface of the bearing sleeve. In particular, as described in Patent Documents, the shaft member is inserted in advance into the housing in the structure in which the housing has a bottomed cylindrical shape. Thus, there also arises a risk that the moved adhesive adheres to the shaft member. That is, it is impossible to obtain a desired fixing strength therebetween or a desired bearing performance.

Further, configurations of the housing and the inner peripheral surface of the bearing sleeve, each of which is made of a resin as described above, are limited to configurations with which an inner mold can be pulled out after injection molding, that is, configurations which are free from portions (so-called undercut) reduced in diameters in a direction of pulling out the inner mold. Owing to the limitation as described above, the configuration of the inner peripheral surface of the member made of a resin is limited to a cylindrical surface, or the like. Therefore, available applications thereof are limited.

In view of the above-mentioned circumstances, the present invention has an object to provide a fluid dynamic bearing device manufactured at lower cost in which a bearing stiffness is increased.

Further, the present invention has another object to provide a fluid dynamic bearing device in which a fixing strength of a bearing sleeve with respect to a housing is increased and which is capable of yielding a stable bearing performance.

Still further, the present invention has still another object to provide a method by which the fixing strength of the bearing sleeve with respect to the housing can easily be increased without deteriorating the bearing performance.

Yet further, the present invention has yet another object to provide at low cost a fluid dynamic bearing device including a member made of a resin available in various applications.

Means for Solving the Problems

In order to achieve the above-mentioned objects, the present invention provides a fluid dynamic bearing device including: a radial bearing portion for rotatably supporting a shaft member through an oil film formed in a radial bearing clearance; a housing for accommodating the radial bearing portion therein, the housing is formed through injection molding of a resin; a lubricant oil filling an inner space of the housing; a seal member for sealing an opening of the housing; a first seal space is formed on an inner peripheral surface of the seal member; and a second seal space is formed on an outer peripheral surface of the seal member.

As described above, when the seal space (second seal space) is formed on the outer peripheral surface of the seal member, the seal space can be disposed on the outer diameter side with respect to the radial bearing clearance of the radial bearing portion. Thus, unlike the conventional cases, it is unnecessary to dispose the radial bearing clearance and the seal space while aligned in an axial direction, and at least a part of both the members can be superimposed on each other in the axial direction. Accordingly, it is possible to reduce an axial dimension of the housing for accommodating the radial bearing portions and the seal space. This represents that an axial span between the radial bearing portions adjacent to each other can be enlarged without changing the axial dimension of the housing. As a result, it is possible to further increase a bearing stiffness, in particular, a moment stiffness.

When the structure as described above is adopted, a configuration of the housing becomes more complicated. Therefore, a significant increase in cost is involved in the case of using a conventional product obtained through turning a metal material. In contrast, when the housing is an injection-molded resin product, even a housing of a complicated configuration can be formed at low cost, whereby a sharp increase in manufacturing cost can be suppressed.

An injection-molded housing is taken out of a die after mold opening while adhering to the outer periphery of a male mold (core). In this case, when a thrusting surface for receiving a thrusting force transmitted from a thrusting mechanism is formed on an end surface on the opening side of the housing, it is possible to smoothly take out a molded product from a die. It is necessary for the thrusting surface to have a sufficient pressure receiving area for receiving a required thrusting force from a thrusting pin or the like. When a large diameter outer peripheral surface and a small diameter outer peripheral surface are provided on the outer peripheral surface of the housing and a large diameter outer peripheral surface is arranged on an outer diameter side of the seal member, it is possible to easily secure a required pressure receiving area on the thrusting surface, to thereby smoothly take out a molded product from a die. Further, with adoption of the structure as described above, it is possible to form a region of the housing on the outer diameter side of the seal member and the other region thereof so as to have thicknesses substantially equal to each other. As a result, poor accuracy of a housing due to variation in molding shrinkage amount can be avoided.

While the case of molding a housing with a resin is described above, it is also possible to form a seal member with injection molding of a resin. As long as a seal space is formed on each of the inner peripheral surface and the outer peripheral surface of the seal member, not only the configuration of the housing but also that of the seal member becomes more complicated. In this context, by means of an injection-molded resin product, it is possible to achieve a further cost reduction as compared with the case of using a turned product. It is possible to form only the seal member by means of an injection-molded resin product, and also possible to form both the seal member and the housing by means of injection-molded resin products. As a result, a further cost reduction can be achieved.

Specifically, the seal member according to the present invention includes: a first seal portion at which the first seal space is formed on the inner peripheral surface thereof; and a second seal portion protruding in an axial direction from one end surface of the first seal portion, at which the second seal space is formed on the outer peripheral surface thereof.

In a fluid dynamic bearing device, in order to eliminate imbalance in pressures of oil filling a housing, the oil is circulated in the housing in many cases. In the case where a seal member is structured as described above, it is necessary to form a groove for circulation of oil on the one end surface of the first seal portion so as to realize a circulation of oil in the housing. In the case where the seal member is a turned product, it is inevitable to form the groove through milling, thereby involving a sharp increase in manufacturing cost. However, when the seal member is an injection-molded resin product as in the present invention, it is possible to mold the groove for circulation of oil simultaneously with the molding of the seal member. As a result, a further cost reduction can be achieved.

Further, in order to achieve the above-mentioned objects, the present invention provides a fluid dynamic bearing device including: a housing of a bottomed cylindrical shape; a bearing sleeve fixed along an inner periphery of the housing; and a shaft member inserted along an inner periphery of the bearing sleeve, the shaft member being supported in a radial direction owing to an oil film formed in a radial bearing clearance provided between the bearing sleeve and the shaft member, characterized in that the housing includes: a first inner peripheral surface to which the bearing sleeve is bonded in a press-fitting manner on an inner diameter side thereof; a second inner peripheral surface which is provided on an opening side with respect to the first inner peripheral surface, and to which the bearing sleeve is bonded through an intermediation of the gaps on the inner diameter side thereof; and a third inner peripheral surface which is provided on an opening side with respect to the second inner peripheral surface, and which has a diameter smaller than a diameter of the second inner peripheral surface and larger than an outer diameter of the bearing sleeve.

As described above, the present invention is characterized in that the housing includes the first inner peripheral surface to which the bearing sleeve is bonded in a press-fitting manner on an inner diameter side thereof and the second inner peripheral surface which is provided on an opening side with respect to the first inner peripheral surface and to which the bearing sleeve is bonded through the intermediation of the gaps on the inner diameter side thereof. In the fluid dynamic bearing device structured as described above, between the bearing sleeve and the housing, a region where both the members are bonded in a press-fitting manner to each other and a region where both the members are bonded to each other through the intermediation of the gaps are aligned in an axial direction. As a result, it is possible to increase a fixing strength therebetween as compared with the case of fixing both the members to each other only through press-fitting or bonding. Further, the third inner peripheral surface can be used as a guide surface upon insertion of the bearing sleeve, which contributes to simplification of assembly.

The fluid dynamic bearing device structured as described above can be manufactured through the following process: The housing is provided with the first inner peripheral surface having a diameter smaller than the outer diameter of the bearing sleeve, the second inner peripheral surface provided on the opening side with respect to the first inner peripheral surface and having a diameter larger than the outer diameter of the bearing sleeve, and the third inner peripheral surface provided on the opening side with respect to the second inner peripheral surface and having a diameter smaller than that of the second inner peripheral surface and larger than the outer diameter of the bearing sleeve; the bearing sleeve is disposed on the inner diameter side of the first inner peripheral surface while the adhesive is applied on the second inner peripheral surface in advance; and after that, the adhesive is introduced between the outer peripheral surface of the bearing sleeve and the first inner peripheral surface. Note that, in order to introduce the adhesive between the outer peripheral surface of the bearing sleeve and the first inner peripheral surface of the housing, it is possible to adopt a method of drawing the adhesive into the above-mentioned region with a capillary force after softening the adhesive, a method of drawing the adhesive into the above-mentioned region by means of vacuum suction, or a method realized by simultaneous use of both the methods.

With this structure, after the press-fit fixation of the bearing sleeve along the inner periphery of the housing, it is possible to supply an adequate amount of adhesive between the first inner peripheral surface of the housing and the outer peripheral surface of the bearing sleeve. Therefore, it is possible to bond the housing and the bearing sleeve to each other in a press-fitting manner while preventing the adhesive from moving toward the bottom portion of the housing, which is apprehended in the case of performing press-fitting in the state where the adhesive is applied in advance on the first inner peripheral surface of the housing or the outer peripheral surface of the bearing sleeve. Further, since the third inner peripheral surface having a diameter smaller than that of the second inner peripheral surface and larger than the outer diameter of the bearing sleeve is provided on the opening side with respect to the second inner peripheral surface of the housing, upon insertion of the bearing sleeve, it is possible to guide the outer peripheral surface of the bearing sleeve by means of the third inner peripheral surface. Accordingly, upon the insertion of the bearing sleeve, especially upon the start of the insertion, the adhesive is prevented from adhering the outer peripheral surface thereof and the one end surface. It is possible to more effectively prevent the adhesive from moving toward the bottom portion of the housing, to thereby yield a stable bearing performance.

Upon fixation of the bearing sleeve and the housing to each other in the above aspect, it is desirable that, regarding difference in radial dimension with respect to the second inner peripheral surface, the third inner peripheral surface be set to measure inner diameter dimension larger than the height of the adhesive applied in advance on the second inner peripheral surface. With this structure, it is possible to reliably prevent the adhesion of the adhesive on the outer peripheral surface and the like upon the insertion of the bearing sleeve, to thereby simplify the assembly operation.

When the housing according to the subject application is a processed product obtained through metal machining, there is a risk that the manufacturing cost thereof may be increased because the machining is complicated owing to a configuration of the housing in which a plurality of inner peripheral surfaces have diameters different from each other. Further, there is a risk that the desired rotational accuracy cannot be obtained because the configuration of the inner peripheral surface of the bearing sleeve is deteriorated, that is, the width accuracy of the radial bearing clearance is deteriorated in the axial region where the bearing sleeve is fixed on (press-fitted to) the first inner peripheral surface. In view of solving those problems, it is desirable that the housing be an injection-molded resin product.

The fluid dynamic bearing device having the above-mentioned structure may be provided with the seal member for sealing the opening of the housing. The present invention is particularly preferably applicable to the fluid dynamic bearing device having the structure in which the first seal space is formed on an inner peripheral side of the seal member, and the second seal space is formed on an outer peripheral side of the seal member.

That is, as illustrated in FIG. 16, the fluid dynamic bearing device of this type is commonly provided with, at the opening of the housing, the seal space for preventing leakage of the lubricant oil filling inside the bearing. As illustrated in FIG. 16, with the structure in which the seal member 79 is fixed along the inner periphery of the housing 77 so as to provide the seal space only on the inner peripheral side thereof, it is possible to complement the fixing strength of the bearing sleeve 78 with respect to the housing 77 owing to the seal member 79. In contrast, there is a disadvantage in increasing the bearing stiffness, in particular, the moment stiffness because the axial distance between the radial bearing portions is reduced owing to the seal space and the radial bearing clearances arraigned in the axial direction. Therefore, in the case where the weight of the disks is increased owing to multiple lamination thereof, it is difficult at present to secure a desired moment stiffness. Meanwhile, in the structure in which the first and the second seal spaces are respectively formed on the inner and the outer peripheral sides of the seal member as described above, there is an advantage in increasing the moment stiffness while expanding the bearing span because the axial dimension of the seal space can be reduced. In this case, however, the seal member is fixed to the bearing sleeve, and hence the complementary effect of the above-mentioned fixing strength cannot be obtained. As a result, there are difficulties in securing the required fixing stiffness. Therefore, with the adoption of the above-mentioned structure of the present invention, it is possible to secure the required fixing strength of the bearing sleeve while increasing the moment stiffness, to thereby provide a fluid dynamic bearing device which is capable of coping with multiple lamination of the disks.

As a matter of course, it is also possible to apply the above-mentioned structure of the present invention to the fluid dynamic bearing device structured as illustrated in FIG. 16, to thereby further increase the fixing strength of the bearing sleeve with respect to the housing.

The fluid dynamic bearing device structured as described above can be preferably used while incorporated in a motor including a stator coil and a rotor magnet.

Further, in order to achieve the above-mentioned objects, the fluid dynamic bearing device according to the present invention includes: the inner member; the outer member disposed on the outer diameter side of the inner member and molded through injection molding of a resin; and a radial bearing clearance formed so as to face the outer peripheral surface of the inner member, the inner member being rotatably supported by means of lubricating films formed in the radial bearing clearance, and is characterized in that the circumferential recessed portion formed of a molded surface is provided on the inner peripheral surface of the outer member.

As described above, in the present invention, the circumferential recessed portion formed of a molded surface is provided on the inner peripheral surface of the outer member made of a resin. With this structure, in the case where the outer member is a housing, for example, and the bearing sleeve serving as an intermediate member is bonded to be fixed on the inner peripheral surface of the housing, the recessed portion of the inner peripheral surface of the housing serves as an adhesive pool, whereby the fixing force between both the members can be increased. Alternatively, in the case where the outer member is an integrally-molded product of the housing and the bearing sleeve, the inner peripheral surface of the outer member faces the radial bearing clearance, and hence the recessed portion of the inner peripheral surface of the outer member serves as an oil pool for supplying the oil into the radial bearing clearance. Therefore, lubricity therebetween can be increased.

Further, the recessed portion is a molded surface formed upon injection molding of the outer member, thereby being formed at low cost without the necessity of the separate processes or apparatuses.

Effects of the Invention

As described above, according to the present invention, it is possible to increase the bearing stiffness while avoiding increase in axial dimension of the fluid dynamic bearing device. In addition, the effects of this type can be easily obtained at low cost.

Further, as described above, according to the present invention, it is possible to provide a fluid dynamic bearing device in which the fixing strength of the bearing sleeve with respect to the housing can be increased so as to be capable of yielding a stable bearing performance. In addition, the fluid dynamic bearing devices of this type can be obtained at low cost.

Still further, as described above, according to the present invention, the fluid dynamic bearing device having a multi-purpose member made of a resin can be obtained at low cost.

BEST MODES FOR CARRYING OUT THE INVENTION

In the following, a first embodiment of the present invention is described with reference to FIGS. 1 through 7.

FIG. 1 is a conceptual drawing illustrating an example of the structure of a spindle motor for an information apparatus into which there is incorporated a dynamic pressure bearing device (fluid dynamic pressure bearing device) 1, which is a kind of fluid dynamic bearing device. This spindle motor for an information apparatus is used in a disk drive such as an HDD, and is provided with the dynamic pressure bearing device 1, a disk hub 3 attached to a shaft member 2 of the dynamic pressure bearing device 1, a stator coil 4 and a rotor magnet 5 that are opposed to each other with, for example, a radial gap therebetween, and a bracket 6. The stator coil 4 is mounted, for example, to the outer peripheral surface of the bracket 6, and the rotor magnet 5 is mounted to the inner periphery of the disk hub 3. The disk hub 3 holds at its outer periphery one or a plurality of disks D such as magnetic disks. When the stator coil 4 is energized, the rotor magnet 5 rotates due to an electromagnetic force generated between the stator coil 4 and the rotor magnet 5, and, with that, the disk hub 3 and the shaft member 2 rotate integrally.

FIG. 2 illustrates an embodiment of the dynamic pressure bearing device 1 used in the above-mentioned spindle motor. The dynamic pressure bearing device 1 includes as main components the shaft member 2, a bottomed cylindrical housing 7, a bearing sleeve 8 accommodated in the housing 7, and a seal member 9 sealing an opening at one end of the housing 7. Note that, in the following, for the sake of convenience in illustration, the opening side of the housing 7 is referred to as the upper side, and the opposite side in an axial direction is referred to as the lower side.

The shaft member 2 is formed of a metal material such as stainless steel, and is provided with a shaft portion 2a and a flange portion 2b provided integrally or separately at the lower end of the shaft portion 2a. Apart from forming the entire shaft member 2 of metal, it is also possible to form all or a part (both end surfaces, for example) of the flange portion 2b by means of a resin, thereby realizing a hybrid structure formed of a metal and a resin.

The housing 7 is integrally formed by a cylindrical small diameter portion 7a, a large diameter portion 7b arranged at one end of the small diameter portion 7a, and a bottom portion 7c which seals the opening at another end of the small diameter portion 7a. An outer peripheral surface 7b1 of the large diameter portion 7b (large diameter outer peripheral surface) has a diameter larger than that of an outer peripheral surface 7a1 (small diameter outer peripheral surface) of the small diameter portion 7a. Similarly, an inner peripheral surface 7b2 of the large diameter portion 7b has a diameter larger than that of an inner peripheral surface 7a2 of the small diameter portion 7a. A boundary surface 7e between the inner peripheral surfaces 7a2 and 7b2 is formed as a flat surface extending in a direction orthogonal to the axial direction. On an inner bottom surface 7c1 of the bottom portion 7c, there is formed a dynamic pressure groove region (indicated by solid filled portions in FIG. 2) serving as a thrust bearing surface. In this region, there are formed, as dynamic pressure generating portions, a plurality of dynamic pressure grooves (not shown) arranged, for example, in a spiral fashion. The small diameter outer peripheral surface 7a1 is fixed to an inner peripheral surface of the bracket 6 illustrated in FIG. 1 by bonding, for example.

The housing 7 is formed by injection molding of a resin. In order to prevent deformation due to difference in molding shrinkage upon curing of a resin, the portions 7a to 7c of the housing 7 are formed to have thicknesses substantially equal to each other.

The resin forming the housing 7 is mainly formed of a thermoplastic resin, and examples of the resin that can be used include amorphous resins such as polysulfone (PSF), polyethersulfone (PES), polyphenylsulfone (PPSU), and polyetherimide (PEI), and crystalline resins such as liquid crystal polymer (LCP), polyetheretherketone (PEEK), polybutyrene terephthalate (PBT), and polyphenylene sulfide (PPS). There are no particular limitations regarding the filler used with the above-mentioned resin, and examples of the filler that can be used include fibrous filler such as glass fiber, whisker-like filler such as potassium titanate, scale-like filler such as mica, and fibrous or powdered conductive filler such as carbon fiber, carbon black, graphite, carbon nanomaterial, and metal powder. Such filler may be used singly or in a combination of two or more kinds of filler.

FIG. 4 illustrates an injection molding process of the housing 7. As illustrated in the figure, of clamped two dies (male die 12 and female die 13), the housing 7 is molded through injection of a molten resin from a point-like gate 14 provided at a shaft center portion of the female die 13 into a cavity. The structure of the gate and the number thereof are arbitrary, and hence a plurality of point-like gates or disk gates may be adopted. The position of the gate is also arbitrary, and hence the gate 14 may be disposed at an outer peripheral end portion of the bottom portion 7c, for example.

When mold opening is performed after curing of a resin, a molded product is taken out of the female die 13 while adhering to the male die 12. After that, an end surface 7f on the opening side is pressed by means of a thrusting mechanism provided to the male die 12, for example, thrusting pins 15, whereby the housing 7 is separated from the male die 12. Thrusting of the housing 7 may be performed, for example, by means of a thrusting ring or a thrusting plate in addition to the thrusting pins.

The bearing sleeve 8 is formed in a cylindrical configuration of a porous material formed of a sintered alloy, such as a sintered metal whose main component is copper. The sintered metal is impregnated with lubricant oil. Apart from this, it is also possible to form the bearing sleeve 8 of a solid metal material such as a soft metal like brass.

On an inner peripheral surface 8a of the bearing sleeve 8, there are provided two upper and lower dynamic pressure groove regions serving as radial bearing surfaces (indicated by solid filled portions in FIG. 2) that are axially spaced apart from each other. As illustrated in FIG. 3, in these two regions, there are formed, as dynamic pressure generating portions, a plurality of dynamic pressure grooves G arranged, for example, in a herringbone-like configuration. The dynamic pressure grooves G in the upper region are formed asymmetrically in the axial direction, and in this region, the axial length X1 of the upper dynamic pressure grooves is somewhat larger than the axial length X2 of the lower dynamic pressure grooves (X1>X2). On the other hand, the dynamic pressure grooves G in the lower region are formed symmetrically in the axial direction, and in this region, the axial lengths of the upper and lower dynamic pressure grooves G are equal to each other. It is also possible for the regions constituting the radial bearing surfaces having the dynamic pressure grooves G to be formed on the outer peripheral surface of the shaft portion 2a of the shaft member 2.

On the lower end surface 8b of the bearing sleeve 8, there is formed a dynamic pressure groove region constituting a thrust bearing surface (indicated by solid filled portions in FIG. 2). In this region, there are formed, as dynamic pressure generating portions, a plurality of dynamic pressure grooves (not shown) arranged, for example, in a spiral fashion.

At one or a plurality of positions arranged at equal circumferential intervals on an outer peripheral surface of the bearing sleeve 8, there are formed axially extending circulation grooves 8d for circulating lubricant oil. Both ends of each circulation grooves 8d are open in the end surfaces 8b and 8c of the bearing sleeve 8.

The seal member 9 is formed as an integral unit of a disk-like first seal portion 9a and a cylindrical second seal portion 9b extending axially from one end surface 9a1 of the first seal portion 9a in reverse-L-shaped sectional configuration. In this embodiment, both an outer peripheral surface 9b1 and an inner peripheral surface 9b2 of the second seal portion 9b are formed in a cylindrical surface configuration, and an inner peripheral surface 9a2 of the first seal portion 9a is formed as a tapered surface that is increased in diameter upwardly. As illustrated in FIGS. 6 and 7, one end surface 9a1 has a radial circulation groove 10 for circulating lubricant oil. The circulation groove 10, which extends across the end surface 9a1, is formed at one or a plurality of positions at equal circumferential intervals (at three positions in FIG. 7). The seal member 9 is formed in the same manner as for the housing, using an injection-molded resin product. The base resin and filler that can be used are the same as those for the housing 7, and hence a description thereof is omitted.

Assembling of the dynamic pressure bearing device 1 is effected through first accommodating the shaft member 2 in the housing 7, and then fixing the bearing sleeve 8 to the inner peripheral surface of the housing 7, and further fixing the seal member 9 to the upper end of the outer peripheral surface of the bearing sleeve 8. After that, the inner space of the housing 7 is filled with lubricant oil, whereby the dynamic pressure bearing device 1 as illustrated in FIG. 2 can be obtained. The fixation between the housing 7 and the bearing sleeve 8, and the fixation between the bearing sleeve 8 and the seal member 9 can be effected through press-fitting, bonding, or press-fit bonding (press-fitting with adhesive therebetween). After the assembly, the end surface 9a1 of the first seal portion 9a constituting the seal member 9 abuts the upper end surface 8c of the bearing sleeve 8, and the lower end surface of the second seal portion 9b is opposed to the boundary surface 7e in the inner periphery of the housing 7 with an axial gap 11 therebetween. Further, the seal member 9 is arranged on the inner side of the large diameter portion 7b of the housing 7.

During rotation of the shaft member 2, the two upper and lower dynamic pressure groove regions constituting the radial bearing surfaces of the inner peripheral surface 8a of the bearing sleeve 8 are opposed to the outer peripheral surface of the shaft portion 2a through the intermediation of radial bearing clearances. Further, the dynamic pressure groove region constituting the thrust bearing surface on the lower end surface 8b of the bearing sleeve 8 is opposed to the upper end surface 2b1 of the flange portion 2b through the intermediation of thrust bearing clearance. Further, the dynamic pressure groove region constituting the thrust bearing surface of the inner bottom surface 7c1 of the housing bottom portion 7c is opposed to the lower end surface 2b2 of the flange portion 2b through the intermediation of thrust bearing clearance. Further, along with rotation of the shaft member 2, a dynamic pressure of lubricant oil is generated in the radial bearing clearances, and the shaft member 2 is rotatably supported in the radial direction in a non-contact fashion by a lubricant oil film formed within the radial bearing clearances. As a result, there are formed a first radial bearing portion R1 and a second radial bearing portion R2 rotatably supporting the shaft member 2 in the radial direction in a non-contact fashion. Simultaneously, a dynamic pressure of lubricant oil is generated in the thrust bearing clearances, and the shaft member 2 is rotatably supported in the thrust direction in a non-contact fashion by the lubricant oil film formed in the two thrust bearing clearances. As a result, there are formed a first thrust bearing portion T1 and a second thrust bearing portion T2 rotatably supporting the shaft member 2 in the thrust direction in a non-contact fashion.

The inner peripheral surface 9a2 of the first seal portion 9a forms between itself and the outer peripheral surface of the shaft portion 2a a first seal space S1 having a predetermined volume. In this embodiment, the inner peripheral surface 9a2 of the first seal portion 9a is formed as a tapered surface gradually increased in diameter upwardly. Accordingly, the first seal space S1 exhibits a tapered configuration gradually diminished downwardly. Further, the outer peripheral surface 9b1 of the second seal portion 9a forms between itself and the large diameter inner peripheral surface 7b2 of the housing 7 a second seal space S2 having a predetermined volume. In this embodiment, the inner peripheral surface 7b2 of the large diameter portion 7b of the housing 7 is formed as a tapered surface gradually increased in diameter upwardly. Thus, the first and second seal spaces S1 and S2 exhibit a tapered configuration gradually diminished downwardly. Thus, by the drawing-in action due to a capillary force, the lubricant oil in the seal spaces S1 and S2 is drawn-in in the direction in which the seal spaces S1 and S2 are diminished in width, whereby the opening at the upper end of the housing 7 is sealed. The seal spaces S1 and S2 also have a buffer function by which they absorb an amount of change in volume due to a change in the temperature of the lubricant oil filling the inner space of the housing 7, and the oil level is constantly within the seal spaces S1 and S2. The volume of the first seal space S1 is smaller than that of the second seal space.

It is also possible to form the inner peripheral surface 9a2 of the first seal portion 9a as a cylindrical surface, and to form the outer peripheral surface of the shaft portion 2a opposed thereto as a tapered surface. In this case, it is also possible to impart the function of a centrifugal seal to the first seal space S1, and hence the sealing effect is further enhanced.

As described above, the dynamic pressure grooves G of the first radial bearing portion R1 is formed asymmetrically in the axial direction, and the axial dimension X of the upper region is larger than the axial dimension Y of the lower region. Thus, during rotation of the shaft member 2, a drawing-in force (pumping force) to the lubricant oil due to the dynamic pressure grooves G is relatively large in the upper region as compared with the lower region. Further, due to this difference in drawing-in force, the lubricant oil filling the gap between the inner peripheral surface 8a of the bearing sleeve 8 and the outer peripheral surface of the shaft portion 2a flows downwards, and circulates through the route: the thrust bearing clearance of the first thrust bearing portion T1→the axial circulation groove 8d→the radial circulation groove 10, before being drawn into the radial bearing clearance of the first radial bearing portion R1 again.

In this way, the lubricant oil flows and circulates through the interior of the housing 7, whereby it is possible to prevent a phenomenon in which the pressure of the lubricant oil filling the interior of the housing 7 becomes locally negative, making it possible to solve the problems such as generation of bubbles due to generation of negative pressure and generation of lubricant oil leakage and vibration due to generation of bubbles. This circulation route for the lubricant oil communicates with the first seal space S1, and further, with the second seal space S2 via the axial gap 11, and hence, even when bubbles are allowed to be mixed into the lubricant oil for some reason or other, such bubbles are discharged into the atmosphere via the oil surfaces (gas/liquid interfaces) in the seal spaces S1 and S2 when the bubbles circulate with the lubricant oil, thus preventing the adverse effect of the bubbles even more effectively.

Note that the axial circulation groove 8d may be formed in the inner peripheral surface of the housing 7, and the radial circulation groove 10 may be formed in the upper end surface 8c of the bearing sleeve 8.

In the present invention, the seal space S2 is formed not only by means of the inner peripheral surface of the seal member 9, but also by means of the outer peripheral surface thereof as described above. Conventionally, both the radial bearing clearance and the seal space are formed by means of the outer peripheral surface of the shaft portion 2a. Therefore, it is inevitable to align both the clearance and space in the axial direction, which leads to increase in required spaces in the axial direction. In contrast, as in the present invention, in the case where the second seal space S2 is formed by means of the outer peripheral surface of the seal member 9, the second seal space S2 can be formed on the outer diameter side of the radial bearing clearance. As illustrated in FIG. 2, it is possible to superimpose on each other in the axial direction a region in which the second seal space S2 is formed and a region in which the radial bearing clearance (radial bearing clearance of first radial bearing portion R1 in the illustrated example) is formed. Further, an amount of oil required for ensuring the buffering function is ensured also in the second seal space S2, and hence an amount of oil to be retained in the first seal space S1 is decreased. As a result, it is possible to decrease the volume of the first seal space S1, that is, the thickness of the first seal portion 9a. For the above-mentioned reasons, the axial dimension of the bearing sleeve 8 can be increased while curbing the increase in axial dimension of the bearing device. In this manner, it is possible to increase the span between the two radial bearing portions R1 and R2, making it possible to increase a bearing stiffness (moment stiffness, in particular), and to cope with multiple lamination of the disks in an HDD device.

Meanwhile, the housing 7 and the seal member 9 whose configuration become more complicated owing to the above-mentioned structure are formed of injection-molded resin products. Thus, it is possible to suppress an increase in cost of those members, to thereby provide the dynamic pressure bearing device 1 at low cost. In particular, the seal member 9 has a substantially cylindrical shape, and hence the cost of seal member 9 is remarkably increased because it is difficult to form the radial groove 10 on the end surface 9a1 when a machined product of a metal material is used therefor. However, with application of injection molding of a resin, it is possible to mold the radial groove 10 simultaneously with the molding of the seal member 9. As a result, a further cost reduction can be achieved.

Further, as illustrated in FIG. 2, the outer peripheral surface (large diameter outer peripheral surface 7b1) of the housing 7 has a diameter larger than those of other portions on the opening side. Therefore, a sufficient thickness can be ensured in the large diameter portion 7b positioned on the outer diameter side of the seal member 9. Accordingly, in the injection molding process, even when the molded product is thrusted by means of the thrusting pin 15 or the like after curing of a resin, the sufficient pressure receiving area can be ensured on the thrusting surface 7f. As a result, it is possible to perform smooth thrusting by means of the thrusting pins or the like. Further, the housing 7 including the large diameter portion 7b can be formed so as to have the substantially uniform thickness as a whole. As a result, it is possible to avoid deterioration in accuracy of the housing 7 due to variation in molding shrinkage amount. For the comparison with the invention of the subject application, a housing 7' of FIG. 5 is formed such that an outer peripheral surface of a portion 7b' corresponding to the large diameter portion 7b has the same dimension as that of the other portions. In this case, it is difficult to ensure a sufficient pressure receiving area on a thrusting surface 7f, and the portion 7b' corresponding to the large diameter portion 7b is thinner than other portions, which leads to variation in molding shrinkage amount.

In the above description, the case is exemplified where the dynamic pressure grooves of each of the first and second thrust bearing portions T1 and T2 are formed on the end surface 8b of the bearing sleeve 8 and on the inner bottom surface 7c1 of the housing bottom portion 7c. However, the dynamic pressure grooves as dynamic pressure generating portions may be formed on either or both the end surfaces 2b1 and 2b2 of the flange portion 2b.

Further, the case is exemplified where the radial bearing portions R1 and R2 and the thrust bearing portions T1 and T2 generate the dynamic pressure action of the lubricant oil by the dynamic pressure grooves of a herringbone-like or a spiral configuration. However, it is also possible to adopt, as the radial bearing portions R1 and R2, so-called step bearings, corrugated bearings, or multi-arc bearings, and to adopt, as the thrust bearing portions T1 and T2, step bearings or corrugated bearings. In addition, it is also possible to adopt, as the radial bearing portions R1 and R2, so-called complete round bearings which do not include the dynamic pressure generating portions, and to adopt, as the thrust bearing portions T1 and T2, pivot bearings with which the end portion of the shaft member is supported in a contact manner.

In the following, a second embodiment of the present invention is described with reference to FIGS. 8 through 15.

FIG. 8 is a conceptual drawing illustrating an example of the structure of a spindle motor for an information apparatus into which a dynamic pressure bearing device 101 is incorporated. This spindle motor is used in a disk drive such as an HDD, and is provided with the fluid dynamic bearing device 101 for rotatably supporting the shaft member 2, the disk hub 3 attached to the shaft member 2, and the stator coil 4 and the rotor magnet 5 that are opposed to each other with, for example, a radial gap therebetween. The stator coil 4 is mounted to the outer periphery of the bracket 6, and the rotor magnet 5 is mounted to the inner periphery of the disk hub 3. The housing 7 of the fluid dynamic bearing device 101 is attached along the inner periphery of the bracket 6. The disk hub 3 holds one or a plurality of disks D such as magnetic disks. When the stator coil 4 is energized, the rotor magnet 5 rotates due to an electromagnetic force generated between the stator coil 4 and the rotor magnet 5, and, with that, the disk hub 3 and the shaft member 2 rotate integrally.

FIG. 9 illustrates an embodiment of the fluid dynamic bearing device 101 used in the above-mentioned spindle motor. The fluid dynamic bearing device 101 includes as main components the shaft member 2, the bottomed cylindrical housing 7, the bearing sleeve 8 fixed along the inner periphery of the housing 7, and a seal member 9 sealing the opening of the housing 7. Note that, in the following, for the sake of convenience in illustration, the opening side of the housing 7 is referred to as the upper side, and the opposite side in an axial direction is referred to as the lower side.

The shaft member 2 is formed of, for example, a metal material such as stainless steel, and is provided with the shaft portion 2a and the flange portion 2b provided integrally or separately at the lower end of the shaft portion 2a. Apart from forming the entire shaft member 2 of metal materials, it is also possible to form all or a part (both end surfaces, for example) of the flange portion 2b by means of a resin, thereby realizing a hybrid structure formed of a metal and a resin.

The bearing sleeve 8 is formed in a cylindrical configuration of a porous material formed of a sintered metal, in particular, a porous material formed of a sintered metal whose main component is copper. Note that, it is also possible to form the bearing sleeve 8 not only of a sintered metal but also of other metal materials other than a porous material, such as a soft metal like brass.

On the inner peripheral surface 8a of the bearing sleeve 8, there are provided two upper and lower regions (solid filled portions of FIG. 9) serving as respective radial bearing surfaces of the first radial bearing portion R1 and the second radial bearing portion R2 so as to be axially spaced apart from each other. In these two regions, there are respectively formed, dynamic pressure grooves 8a1 and 8a2 of a herringbone-like configuration as illustrated in FIG. 10, for example. The dynamic pressure groove 8a1 is formed asymmetrically in the axial direction with respect to an axial center m (axial center of the region between the upper and lower inclined grooves), and the axial dimension X1 in the upper region with respect to the axial center m is larger than the axial dimension X2 in the lower region. Note that, it is also possible to form the dynamic pressure grooves on the outer peripheral surface 2a1 of the shaft portion 2a. On the outer peripheral surface 8d of the bearing sleeve 8, one or a plurality of axial grooves 8d1 are formed so as to communicate both the end surface 8b and 8c with each other. In this embodiment, the axial grooves 8d1 are arranged at three portions in a circumferential direction at equal intervals.

On the lower end surface 8b of the bearing sleeve 8, there is provided a region (solid filled portions of FIG. 9) constituting a thrust bearing surface of the first thrust bearing portion T1. In this region, there are formed a plurality of dynamic pressure grooves (not shown) arranged, for example, in a spiral fashion.

The housing 7 is formed by the cylindrical small diameter portion 7a, the large diameter portion 7b arranged on the upper side of the small diameter portion 7a, and the bottom portion 7c which seals the opening at the lower end of the small diameter portion 7a. The portions 7a to 7c are integrally formed with each other. The inner peripheral surface and the outer peripheral surface 7a1 of the small diameter portion 7a have diameters smaller than those of the inner peripheral surface 7b2 and the outer peripheral surface 7b1 of the large diameter portion 7b, respectively. The inner peripheral surface of the small diameter portion 7a and the inner peripheral surface 7b2 of the large portion 7b are continuous with each other through an intermediation of the stepped surface 7e formed as a flat surface extending in a direction orthogonal to the axial direction.

As illustrated in an enlarged manner in FIG. 11, in the small diameter portion 7a, there are formed a first inner peripheral surface 7a21, a second inner peripheral surface 7a22 provided on the upper side (opening side) with respect to the first inner peripheral surface 7a21, and a third inner peripheral surface 7a23 provided on the upper side (opening side) with respect to the second inner peripheral surface 7a22. The inner peripheral surfaces 7a21 to 7a23 are different in inner diameter dimension from each other. Specifically, an inner diameter dimension d3 of the third inner peripheral surface 7a23 is larger than the inner diameter dimension d1 of the first inner peripheral surface 7a21, and is smaller than an inner diameter dimension d2 of a second inner peripheral surface 7a22 (d1<d3<d2). Further, with reference to an outer diameter dimension (strictly, outer diameter dimension measured before fixation to housing 7) d4 of the bearing sleeve 8, the respective inner diameter dimensions d1, d2, and d3 of the first to third inner peripheral surfaces 7a21 to 7a23 satisfy the following: d1<d4, d2>d4, and d3>d4. Note that, any of the inner diameter dimensions d1, d2, and d3 of the housing 7 and the outer diameter dimension d4 of the bearing sleeve 8 is measured prior to assembly thereof. In the assembled state, the bearing sleeve 8 is press-fitted to the first inner peripheral surface 7a21 of the housing 7, and hence an inner diameter dimension d1' of the first inner peripheral surface 7a21 becomes equal to or larger than the outer diameter dimension d4 of the bearing sleeve 8 (d1'>d4) at least in a press-fitting region. That is, while in the press-fitting region, the inner diameter dimension d1' of the first inner peripheral surface 7a21 is basically equal to the outer diameter dimension d4 of the bearing sleeve 8, owing to variation in surface accuracy of those surfaces, the inner diameter dimension d1' of the first inner peripheral surface 7a21 becomes partially larger than the outer diameter dimension d4 of the bearing sleeve 8.

Further, in this embodiment, an adhesive 20 is applied onto the second inner peripheral surface 7a22 prior to mounting of the bearing sleeve 8, which is described later in detail. The difference in radial dimension (=(d2−d3)/2) between the second inner peripheral surface 7a22 and the third inner peripheral surface 7a23 is set larger than the height of the applied adhesive 20. Note that, FIG. 11 exaggeratingly illustrates the portions for the sake of facilitating the understanding thereof. Actually, even the largest difference in inner diameter dimension (d2−d1) is approximately 20 to 200 μm, which is measured between the first inner peripheral surface 7a21 and the second inner peripheral surface 7a22.

On the inner bottom surface 7c1 of the bottom portion 7c of the housing 7, there is provided a region (solid filled portions of FIG. 9) constituting a thrust bearing surface of the second thrust bearing portion T2. In this region, there are formed a plurality of dynamic pressure grooves (not shown) arranged, for example, in a spiral fashion.

The housing 7 structured as described above is formed by injection molding of a resin. In order to prevent deformation due to difference in shrinkage amount upon molding shrinkage, the portions 7a to 7c of the housing 7 are formed to have thicknesses substantially equal to each other.

The resin forming the housing 7 is mainly formed of thermoplastic resin, and examples of the resin that can be used include amorphous resins such as polysulfone (PSF), polyethersulfone (PES), polyphenylsulfone (PPSU), and polyetherimide (PEI), and crystalline resins such as liquid crystal polymer (LCP), polyetheretherketone (PEEK), polybutyrene terephthalate (PBT), and polyphenylene sulfide (PPS). There are no particular limitations regarding the filler used with the above-mentioned resin, and examples of the filler that can be used include fibrous filler such as glass fiber, whisker-like filler such as potassium titanate, scale-like filler such as mica, and fibrous or powdered conductive filler such as carbon fiber, carbon black, graphite, carbon nanomaterial, and metal powder. Such filler may be used singly or in a combination of two or more kinds of filler.

FIG. 12 illustrates an example of an injection molding process of the housing 7 structured as described above. As illustrated in the figure, of clamped two dies (male die 12 and female die 13), the housing 7 is molded through injection of a molten resin from the gate (point-like gate) 14 provided at a shaft center portion of the female die 13 into a cavity. The structure of the gate and the number thereof are arbitrary, and hence a plurality of point-like gates or disk gates may be adopted. The position of the gate is also arbitrary, and hence the gate 14 may be disposed at an outer peripheral end portion of the bottom portion 7c, for example.

When mold opening is performed after curing of a resin, a molded product is taken out of the female die 13 while adhering to the male die 12. After that, the opening end surface 7f of the housing 7 is pressed by means of a thrusting mechanism provided to the male die 12, for example, thrusting pins 15, whereby the housing 7 is separated from the male die 12. In this case, of the male die 12, molded portion of the second inner peripheral surface 7a22 is subjected to so-called forcible pulling out. However, the housing 7 is formed of a resin material, and the second inner peripheral surface 7a22 and the third inner peripheral surface 7a23 are smoothly continuous with each other through an intermediation of the inclined surface. Therefore, there is no risk of deforming or damaging the third inner peripheral surface 7a23 of the smaller diameter portion 7a in accordance with the forcible pulling out. Note that, thrusting of the housing 7 may be performed by means of a thrusting ring or a thrusting plate in addition to the thrusting pins.

The seal member 9 is formed, for example, of a soft metal material such as brass, other metal materials, or a resin material used for molding the housing 7 described above, and is formed as an integral unit of a reverse-L-shaped sectional configuration, which includes the disk-like first seal portion 9a and the cylindrical second seal portion 9b downwardly protruding on the outer diameter side of the first seal portion 9a. The first seal space S1 having a predetermined volume is formed between the inner peripheral surface 9a2 of the first seal portion 9a and the outer peripheral surface 2a1 of the shaft portion 2a. Further, the second seal space S2 having a predetermined volume is formed between the outer peripheral surface 9b1 of the second seal portion 9b and the inner peripheral surface 7b2 of the large diameter portion 7b constituting the housing 7. In this embodiment, the inner peripheral surface 9a2 of the first seal portion 9a and the inner peripheral surface 7b2 of the large diameter portion 7b of the housing 7 are each formed as a tapered surface that is increased in diameter upwardly. Accordingly, the first and second seal spaces S1 and S2 each exhibit a tapered configuration gradually diminished downwardly.

As illustrated in FIG. 13, on the lower end surface 9a1 of the first seal portion 9a, one or a plurality of radial grooves 10 are formed so as to extend across the lower end surface 9a1. In this embodiment, the radial grooves 10 are arranged at three portions in a circumferential direction at equal intervals as illustrated in FIG. 14.

The fluid dynamic bearing device 1 constituted by means of the above-mentioned components can be assembled as follows. The bearing sleeve 8 is fixed along the inner periphery of the housing 7 after the shaft member 2 is accommodated into the housing 7, and further, the seal member 9 is fixed to the bearing sleeve 8.

Specifically, first, in the state where the thermosetting adhesive 20, for example, is applied on the second inner peripheral surface 7a22 of the housing 7, the bearing sleeve 8 is inserted to a predetermined position (position at which the thrust bearing clearance can be ensured) on the first inner peripheral surface 7a21 while the outer peripheral surface 8d is guided by means of the third inner peripheral surface 7a23 of the housing 7 as illustrated in FIG. 15. As a result, the bearing sleeve 8 is fixed in a press-fitting manner to the first inner peripheral surface 7a21 of the housing 7. The inner diameter dimension d3 of the third inner peripheral surface 7a23 is smaller than the inner diameter dimension d2 of the second inner peripheral surface 7a22, and is larger than the outer diameter dimension d4 of the bearing sleeve 8. Further, the difference in radial dimension between the second and third inner peripheral surfaces is set larger than the height of the applied adhesive 20. Therefore, it is possible to fix the bearing sleeve 8 in a press-fitting manner while avoiding the state where, along with the insertion of the bearing sleeve 8, the adhesive 20 adheres to the outer peripheral surface 8d and the lower end surface 8b to move toward the bottom portion 7c side of the housing 7.

Next, heating treatment is performed on the assembly thus obtained. Under the heating treatment (baking), the adhesive 20 applied on the second inner peripheral surface 7a22 of the housing 7 is temporally softened, and a part thereof is drawn owing to a capillary force between the first inner peripheral surface 7a22 of the housing 7 and the outer peripheral surface 8d of the bearing sleeve 8. When the adhesive 20 is cured after the heated state is maintained for a while, as illustrated in FIG. 11, on the inner diameter side of the first inner peripheral surface 7a21, the housing 7 and the bearing sleeve 8 are bonded in a press-fitting manner with each other, and on the inner diameter side of the second inner peripheral surface 7a22, the housing 7 and the bearing sleeve 8 are bonded with each other through the intermediation of gaps over the entire peripheries by means of the residual adhesive 20.

Note that, while not shown, in order to evenly prevail the adhesive 20 between the first inner peripheral surface 7a21 and the outer peripheral surface 8d of the bearing sleeve 8 for the sake of increasing the fixing strength therebetween, it is possible to draw-in the adhesive 20 onto the bottom portion 7c side of the housing 7 by means such as vacuum suction upon the heating treatment.

Further, a gap formed between the outer peripheral surface 8d of the bearing sleeve 8 and the first inner peripheral surface 7a22 of the housing 7 is sufficiently smaller than a space (through-hole) formed between the axial grooves 8d1 provided on the outer peripheral surface 8d of the bearing sleeve 8 and the inner peripheral surface of the housing 7. Therefore, even when the adhesive 20 flows into the axial grooves 8d1, a capillary force is exerted on the adhesive 20, and hence the axial grooves 8d1 are not filled with the adhesive 20.

Further, as a result of the fixation of the housing 7 and the bearing sleeve 8 to each other as in the above-mentioned mode, the adhesive 20 of sufficient amount does not remain between the second inner peripheral surface 7a2 and the outer peripheral surface 8d of the bearing sleeve 8. Therefore, the fixing strength in the portions bonded through the intermediation of gaps may be insufficient in some cases. In those cases, the adhesive 20 may be replenished between the second inner peripheral surface 7a22 and the outer peripheral surface 8d of the bearing sleeve 8. In that case, the adhesive 20 to be replenished may be an anaerobic adhesive in place of a thermosetting adhesive similar to the above.

In the above description, the case is described where the thermosetting adhesive is used as the adhesive 20 and the adhesive 20 is introduced between the first inner peripheral surface 7a21 of the housing 7 and the outer peripheral surface 8d of the bearing sleeve 8 under heating treatment. However, an anaerobic adhesive may be used as the adhesive 20 so that the adhesive 20 can be introduced between those surfaces by means of vacuum suction.

When assembly of the housing 7 and the bearing sleeve 8 is completed as described above, the seal member 9 is fixed to the upper end of the outer periphery of the bearing sleeve 8 through appropriate means such as bonding, press-fitting, or press-fit bonding. When assembly of the seal member 9 is completed, the lower end surface 9a1 of the first seal portion 9a constituting the seal member 9 is brought into contact with the upper end surface 8c of the bearing sleeve 8, and the lower end surface of the second seal portion 9b faces the stepped surface 7e of the housing 7 through intermediation of the predetermined axial gap 11. Simultaneously, the first seal space S1 is formed between the inner peripheral surface 9a2 of the first seal portion 9a and the outer peripheral surface 2a1 of the shaft portion 2a, and the second seal space S2 is formed between the outer peripheral surface 9b1 of the second seal portion 9b and the inner peripheral surface 7a2 of the large diameter portion of the housing 7. After that, the inner space of the housing 7, which is sealed with the seal member 9 and includes pores in the bearing sleeve 8, is filled with a lubricant oil, whereby the fluid dynamic bearing device 1 as illustrated in FIG. 9 is completed.

During rotation of the shaft member 2, the two upper and lower regions serving as the radial bearing surfaces of the inner peripheral surface 8a of the bearing sleeve 8 face the outer peripheral surface 2a1 of the shaft portion 2a through the intermediation of the radial bearing clearances. Further, the region constituting the thrust bearing surface on the lower end surface 8b of the bearing sleeve 8 is opposed to the upper end surface 2b1 of the flange portion 2b through the intermediation of thrust bearing clearance. Further, the region constituting the thrust bearing surface of the inner bottom surface 7c1 of the housing 7 is opposed to the lower end surface 2b2 of the flange portion 2b through the intermediation of thrust bearing clearance. Further, along with rotation of the shaft member 2, a dynamic pressure of lubricant oil is generated in the radial bearing clearances, and the shaft portion 2a of the shaft member 2 is rotatably supported in the radial direction in a non-contact fashion through a lubricant oil film formed within the radial bearing clearances. As a result, there are formed a first radial bearing portion R1 and a second radial bearing portion R2 for rotatably supporting the shaft member 2 in the radial direction in a non-contact fashion. Simultaneously, a dynamic pressure of lubricant oil is generated in the thrust bearing clearances, and the shaft member 2 is rotatably supported in the thrust direction in a non-contact fashion through the lubricant oil film formed in the thrust bearing clearances. As a result, there are formed a first thrust bearing portion T1 and a second thrust bearing portion T2 for rotatably supporting the shaft member 2 in both the thrust directions in a non-contact fashion.

Further, during rotation of the shaft member 2, the first and second seal spaces S1 and S2 each exhibit a tapered configuration gradually diminished toward the inside of the housing 7 as described above. Therefore, owing to drawing-in action caused by a capillary force, a lubricant oil in both the seal spaces S1 and S2 is drawn in a direction in which the seal spaces are narrowed, that is, drawn toward the inside of the housing 7. As a result, it is possible to effectively prevent leakage of the lubricant oil from the inside of the housing 7. Further, the seal spaces S1 and S2 each have a buffering function with which the volume amount varied in accordance with the variation in temperature of the lubricant oil filling the inner spaces of the housing 7 is absorbed. Within the expected range of the variation in temperature, the oil surfaces of the lubricant oil are constantly formed in the seal spaces S1 and S2.

Note that, it is also possible to form the inner peripheral surface 9a2 of the first seal portion 9a as a cylindrical surface, and to form the outer peripheral surface of the shaft portion 2a opposed thereto as a tapered surface. In this case, it is also possible to impart the function of a centrifugal seal to the first seal space S1, and hence the sealing effect is further enhanced.

Further, as described above, the upper dynamic pressure grooves 8a1 are formed asymmetrically in the axial direction with respect to the axial center m, and the axial dimension X1 of the upper region with respect to the axial center m is larger than the axial dimension X2 of the lower region (refer to FIG. 3). Thus, during rotation of the shaft member 2, a drawing-in force (pumping force) to the lubricant oil due to the dynamic pressure grooves 8a1 is relatively large in the upper region as compared with the lower region. Further, due to this difference in a drawing-in force, the lubricant oil filling the gap between the inner peripheral surface 8a of the bearing sleeve 8 and the outer peripheral surface 2a1 of the shaft portion 2a flows downwards, and circulates through the route: the thrust bearing clearance of the first thrust bearing portion T1→the fluid path formed by means of the axial grooves 8d1 of the bearing sleeve 8→the fluid path formed by means of the radial grooves 10 of the first seal portion 9a before being drawn into the radial bearing clearance of the first radial bearing portion R1 again.

In this way, the lubricant oil flows and circulates through the inner spaces of the housing 7, whereby it is possible to maintain the balance in pressures of the lubricant oil, making it possible to solve the problems such as generation of bubbles due to generation of local negative pressure, and occurrence of lubricant oil leakage and generation of vibration due to generation of bubbles. The above-mentioned circulation route communicates with the first seal space S1, and further, with the second seal space S2 via the axial gap 11, and hence, even when bubbles are allowed to be mixed into the lubricant oil for some reason or other, such bubbles are discharged into the atmosphere via the oil surfaces (gas/liquid interfaces) of the lubricant oil in those seal spaces S1 and S2 when the bubbles circulate with the lubricant oil. Accordingly, the adverse effect of the bubbles can be prevented even more effectively.

Note that, although not shown, the axial fluid path may be formed by providing the axial groove on the inner peripheral surface of the housing 7, and the radial fluid path may be formed by providing the radial groove on the upper end surface 8c of the bearing sleeve 8.

In the fluid dynamic bearing device 1 described above, between the bearing sleeve 8 and the housing 7, a region where both the members are bonded in a press-fitting manner to each other and a region where both the members are bonded to each other through intermediation of the gaps are aligned in the axial direction. As a result, it is possible to increase a fixing strength therebetween as compared with the case of fixing both the members to each other only through press-fitting or bonding, to thereby cope with multiple lamination of the disks. Further, through assembly of both the members to each other with the above-mentioned method, it is possible to prevent the adhesive from moving toward the bottom portion of the housing, which is apprehended during the assembly of both the members, to thereby avoid the adverse effect on the rotational performance.

Further, in the fluid dynamic bearing device 1 of this embodiment, the seal space is formed not only on the inner peripheral side of the seal member 9 but also on the outer peripheral side thereof. The seal space has the volume with which the volume amount varied in accordance with the variation in temperature of the lubricant oil filling the inner spaces of the housing 7 is absorbed. Accordingly, with the structure of this embodiment, it is possible to reduce the axial dimension of the first seal space S1 with respect to that of the structure illustrated in FIG. 16 because the second seal space S2 is also provided on the outer peripheral side of the seal member 9. Therefore, for example, without increasing the axial dimension of the bearing device (housing 7), it is possible to increase the axial length of the bearing sleeve 8, that is, the bearing span between both the radial bearing portions R1 and R2 with respect to that of the structure illustrated in FIG. 16, to thereby increase the moment stiffness. Also in this regard, it is possible to cope with multiple lamination of the disks.

Meanwhile, the housing 7 of the complicated configuration is formed of an injection-molded resin product, and hence a sharp increase in manufacturing cost can be suppressed. As a result, the cost reduction in manufacturing the fluid dynamic bearing device 1 is achieved. Further, by means of the housing 7 formed of an injection-molded resin product, it is possible to avoid the deterioration of the inner peripheral configuration of the bearing sleeve 8 caused in the fixing region in which the bearing sleeve 8 is fixed to the first inner peripheral surface 7a21 of the housing 7, that is, the deterioration of the rotational accuracy in the radial direction.

As described above, the fluid dynamic bearing device according to an embodiment of the present invention is described. The structure of the present invention, in which inner peripheries of the opening of the housing are different from each other, can be applied to a fluid dynamic bearing device 70 structured as illustrated in FIG. 16.

Further, while in the above description the radial bearing portions R1 and R2 and the thrust bearing portions T1 and T2 generate the dynamic pressure action of the lubricant oil by the dynamic pressure grooves of a herringbone-like or a spiral configuration, it is also possible to adopt, as the radial bearing portions R1 and R2, so-called step bearings, multi-arc bearings, or non-complete round bearings, and to adopt, as the thrust bearing portions T1 and T2, so-called step bearings or corrugated bearings. Further, when the radial bearing portion is the step bearing or the multi-arc bearing, two radial bearing portions may be provided separately in an axial direction from each other like the radial bearing portions R1 and R2. Alternatively, one radial bearing portion may be formed over the upper and lower regions of the inner peripheral side of the bearing sleeve 8. In addition, it is also possible to adopt, as the radial bearing portions R1 and R2, so-called complete round bearings which do not include the dynamic pressure generating portions, and to adopt, as the thrust bearing portions, pivot bearings with which the end portion of the shaft member is supported in a contact fashion.

A confirmation test was performed for verifying the effectiveness of the invention of the subject application. In the confirmation test, the pulling resistance (unmating force) of the shaft member 2 is measured after the bearing sleeve 8 is fixed in the state where the shaft member 2 is accommodated in the housing 7. The housing for the test integrally includes the small diameter portion 7a, the large diameter portion 7b, and the bottom portion 7c as in a mode illustrated in FIG. 9. The housing used in an example includes the small diameter portion 7a having the structure as illustrated in an enlarged manner in FIG. 11. The housing used in a comparative example includes the small diameter portion 7a having the inner peripheral surface formed to be a straight cylindrical surface as a whole, the inner peripheral surface being bonded to the bearing sleeve (bonded through intermediation of gaps). Note that, the same thermosetting adhesive was used for both the housings.

In the example, an unmating force of approximately 1000 N was obtained. Meanwhile, in the comparative example, an unmating force of only approximately 500 N was obtained. Therefore, the effectiveness of the present invention can be confirmed.

In the following, a third embodiment of the present invention is described with reference to FIGS. 17 through 21.

FIG. 17 is a conceptual drawing illustrating an example of the structure of a spindle motor for an information apparatus into which there is incorporated a fluid dynamic bearing device (dynamic pressure bearing device) 201 according to the embodiment of the present invention. This spindle motor is used in a disk drive such as an HDD, and is provided with the dynamic pressure bearing device 201 for rotatably supporting in a non-contact fashion a shaft member 202 to which the disk hub 3 is attached, the stator coil 4 and the rotor magnet 5 that are opposed to each other with, for example, a radial gap therebetween, and the motor bracket 6. The stator coil 4 is mounted to the outer periphery of the motor bracket 6, and the rotor magnet 5 is mounted to the outer portion of the disk hub 3. The dynamic pressure bearing device 201 is fixed along the inner periphery of the motor bracket 6. The disk hub 3 holds one or a plurality of (two disks in this embodiment) disk-like information recording media (hereinafter, simply referred to as disk) D such as magnetic disks. In the spindle motor structured as described above, when the stator coil 4 is energized, the rotor magnet 5 rotates due to an electromagnetic force generated between the stator coil 4 and the rotor magnet 5. In accordance therewith, the disk hub 3 and the disks D held by means of the disk hub 3 rotate integrally with the shaft member 202.

FIG. 18 illustrates the dynamic pressure bearing device 201. The dynamic pressure bearing device 201 includes as main components a housing 207 serving as an outer member A, a bearing sleeve 208 serving as an intermediate member B fixed to the housing 207, and the shaft member 202 serving as an inner member C which rotates relatively to the housing 207 and the bearing sleeve 208. In this embodiment, the housing 207 includes a side portion 207a and a bottom portion 207b so as to be formed in a cup shape. Note that, in the following, for the sake of convenience in illustration, the bottom portion 207b side of the housing 207 is referred to as the lower side, and the side opposite to the bottom portion 207b is referred to as the upper side.

The shaft member 202 is formed of a metal material such as SUS steel, and is provided with a shaft portion 202a and a flange portion 202b provided integrally or separately at the lower end of the shaft portion 202a. Note that, while not limited thereto, the shaft member 202 may have a hybrid structure formed of a metal material and a resin material.

The bearing sleeve 208 is formed in a cylindrical configuration of a porous material formed of a sintered metal whose main component is copper, for example. Alternatively, it is also possible to form the bearing sleeve 208 of other metals, resins, ceramics, or the like.

As illustrated in FIG. 19($a$), for example, on the entire of or on a partially cylindrical region of the inner peripheral surface 208a of the bearing sleeve 208, there are formed as radial dynamic pressure generating portions, while separated in an axial direction from each other, two regions where a plurality of dynamic pressure grooves 208a1 and 208a2 are respectively arranged in a herringbone-like configuration. The regions where the dynamic pressure grooves 208a1 and 208a2 are formed face, as a radial bearing surface, the outer peripheral surface 2a1 of the shaft portion 2a. During rotation of the shaft member 202, the radial bearing clearances described later of the radial bearing portions R1 and R2 are formed between the dynamic pressure grooves 208a1 and 208a2 and the outer peripheral surface 2a1 (refer to FIG. 18). Further, in the region where the upper pressure grooves 208a1 are formed, the upper pressure grooves 208a1 are formed asymmetrically in the axial direction with respect to the axial center m (axial center of the region between upper and lower inclined grooves), and the axial dimension X1 in the upper region with respect to the axial center m is larger than the axial dimension X2 in the lower region.

On the outer peripheral surface 208b of the bearing sleeve 208, one or a plurality of grooves 208e are formed which extend over the entire axial direction. In this embodiment, three axial grooves 208e are formed in a circumferential direction at equal intervals. In the state where the bearing sleeve 208 is fixed along the inner periphery of the housing 207, those axial grooves 208e constitute, with the aid of the inner peripheral surface 207a1 of the housing 207 opposite thereto, the fluid path 210b for a lubricant oil therebetween (refer to FIG. 18). With the previous provision of the portions corresponding to the axial grooves 208e in the molding die for the green compact forming the main body of the bearing sleeve 208, for example, those axial grooves 208e can be molded simultaneously with the green compact molding of the main body of the bearing sleeve 208

As illustrated in FIG. 19($b$), on the entire of or on a partially circular region of the lower end surface 208c of the bearing sleeve 208, there is formed, as a thrust dynamic pressure generating portion, a region where a plurality of dynamic pressure grooves 208c1 are arranged in a spiral configuration. The region where the dynamic pressure grooves 208c1 are formed faces, as a thrust bearing surface, an upper end surface 202b1 of the flange portion 202. During rotation of the shaft member 202, the thrust bearing clearance described later of the first thrust bearing portion T1 are formed between the dynamic pressure grooves 208c1 and the upper end surface 202b1 (refer to FIG. 18).

At the substantially central position in the radial direction of an upper end surface 208d of the bearing sleeve 208, a circumferential groove 208d1 of a V-shaped sectional configuration is formed over the entire circumference as illustrated in FIG. 19($a$). In the region on the inner diameter side of the upper end surface 208d partitioned by means of the circumferential groove 208d1, one or a plurality of radial grooves 208d2 are formed. In the state where the bearing sleeve 208 is held in contact with a seal portion 209, a fluid path 210c is constituted by means of the gap between the region on the outer diameter side of the lower end surface 209b of the seal portion 209 and the upper end surface 208d of the bearing sleeve 208, the circumferential groove 208d1, and the radial groove 208d2 (refer to FIG. 18).

The housing 207 includes the side portion 207a and the bottom portion 207b so as to be formed in a cup shape. On the entire of or on a partially circular region of an inner bottom surface 207b1 of the housing 207, there is formed, as a thrust dynamic pressure generating portion, a region (not shown) where a plurality of dynamic pressure grooves are arranged in a spiral configuration. The region where the dynamic pressure grooves are formed faces, as a thrust bearing surface, a lower end surface 202b2 of the flange portion 202b. During rotation of the shaft member 202, the thrust bearing clearance described later of the second thrust bearing portion T2 are formed between the dynamic pressure grooves and the lower end surface 202b2 (refer to FIG. 18).

On the inner peripheral surface 207a1 of the housing 207, one or a plurality of recessed portions are formed in a circumferential direction while other portions are formed in a configuration free from undercut. In this embodiment, one circular groove 211 is formed at substantially central portion in the axial direction of the inner peripheral surface 207a1.

The housing 207 is injection-molded of a crystalline resin such as LCP, PPS, or PEEK, or of a resin product material made of an amorphous resin as a base resin, such as PSU, PES, or PEI. Examples of the resin product material forming the housing 207 include fibrous filler such as glass fiber, whisker filler such as potassium titanate, flake filler such as mica, fibrous or powdery conductive filler of carbon fiber, carbon black, graphite, carbon nanomaterial, or metal powders of various types, each of which is applicable while compounded with the base resin by an adequate amount in accordance with the purpose.

A molding process of the housing 207 is illustrated with reference to FIG. 20. First, along the outer periphery of a shaft portion 212a of a movable die 212, a circular member 214 for forming the circular groove 211 is inserted and is fixed on the outer peripheral surface of the shaft portion 212a through press-fitting, for example. In this state, the movable die 212 and the fixed die 213 are clamped with each other, and the molten resin is injected into the cavity. In this manner, it is possible to integrally form the housing 207 and the circular member 214 with each other (refer to FIG. 20(a)). The material available as the circular member 214 is dissolved in a particular solvent, and has heat resistance with which the molding temperature upon injection molding is endured. Further, the solvent for dissolving the circular member 214 preferably does not have influence as much as possible on the resin material of the housing 207. Examples of the material which satisfies the above-mentioned conditions include a resin material obtained through compounding a water-soluble resin such as polyacrylic acid, polyacrylamide, or polyvinylpyrrolidone with an appropriate filler.

After the injected dissolved resin is cured, the shaft portion 212a is pulled out of the inner periphery of the housing 207 simultaneously with the mold opening. In this manner, the integrally-molded product of the housing 207 and the circular member 214 is taken out of the die. In this case, the circular member 214 inserted around the shaft portion 212a is retained by means of the housing 207, and hence the shaft portion 212a and the circular member 214 are separated from each other. As a result, the integrally-molded product of the housing 207 and the circular member 214 is taken out thereof (refer to FIG. 20(b)). After that, when the circular member 214 is dissolved by means of a particular solvent, the circular groove 211 constituted by a surface molded by means of the circular member 214 is formed on the inner peripheral surface 207a1 of the housing 207 (refer to FIG. 20(c)). With the formation performed by means of the molded surface as described above, the circular groove 211 can be simply formed without the necessity of the separate processes or apparatuses unlike the case of being formed through machining process such as cutting. As a result, manufacturing cost reduction can be achieved.

On the inner peripheral surface of the housing 207 formed as described above, the outer peripheral surface 208b of the bearing sleeve 208 is fixed by press-fit bonding, for example. In this case, the circular groove 211 functions also as an adhesive pool, and hence the housing 207 and the bearing sleeve 208 are more firmly fixed to each other. As a result, it is possible to avoid the risk of failure, which is caused owing to an impact load or the like, of the fixation between the housing 207 and the bearing sleeve 208. In particular, the present invention is preferably applicable to the bearing device as in this embodiment in which the weight of the device is increased owing to a plurality of disks mounted thereto, which leads to a risk of an increase in impact load.

Examples of the adhesive used for the fixation between the housing 207 and the bearing sleeve 208 include a thermosetting adhesive. In this case, the adhesive is applied so as to fill the circular groove 211, and the bearing sleeve 208 is inserted along the inner periphery of the housing 207. After that, those members are heated so as to cure the adhesive. Upon the heating, since the housing 207 made of a resin and the bearing sleeve 208 made of a metal are different from each other in linear expansion coefficient, the gap between the circular groove 211 of the inner peripheral surface 207a of the housing 207 and the outer peripheral surface 208b of the bearing sleeve 208 is slightly expanded in the radial direction. The adhesive is cured in this state. After that, when the expanded diameter of the inner peripheral surface 207a of the housing 207 is decreased in accordance with the temperature decreased to the normal temperature, the bearing sleeve 208 is compressed therearound through an intermediation of the adhesive cured in the expanded state. Thus, there is a risk of deformation of the inner peripheral surface 208a of the bearing sleeve 208. In order to prevent the deformation from affecting the bearing clearances of the radial bearing portions R1 and R2, it is preferable that the circular groove 211 be provided not in the regions in the axial direction where the radial bearing portions R1 and R2 are formed, but in the region in the axial direction between the radial bearing portions R1 and R2 (refer to FIG. 18).

Further, when a surface accuracy of a cylindrical surface 207a11 on which the bearing sleeve 208 is fixed is poor on the inner peripheral surface 207a1 of the housing 207, the fixing accuracy of the bearing sleeve 208 is deteriorated, which may lead to a risk of deteriorating the rotational accuracy of the shaft member 202. In this embodiment, as illustrated in FIG. 20(a), the cylindrical surface 207a11 of the housing 207 is formed on the outer peripheral surface of the shaft portion 212a of the movable die 212. Therefore, with processing of the die with high accuracy, it is possible to mold the housing 207 of high accuracy.

As illustrated in FIG. 18, the seal portion 209 is formed of, for example, a metal material or a resin material while separated from the housing 207, so as to be fixed to the inner periphery of the upper end of the side portion 207a of the housing 207 by means of press-fitting, bonding, depositing, or welding. In this embodiment, the fixation of the seal portion 209 is performed in the state where the lower end surface 209b of the seal portion 209 is held in contact with the upper end surface 208d of the bearing sleeve 208 (refer to FIG. 18).

The inner peripheral surface 209a of the seal portion 209 is formed as a tapered surface. Between the tapered surface and the outer peripheral surface 202a1 of the shaft portion 202a opposed to the tapered surface, the circular seal space S is formed whose radial dimension gradually increases in an upward direction. The lubricant oil is supplied into the inner space of the housing 207 sealed by means of the seal portion 209 so as to fill the housing 207 (region of dispersed points in FIG. 18). In this state, the oil surface of the lubricant oil is retained in the range of the seal space S.

In the dynamic pressure bearing device 201 structured as described above, during the rotation of the shaft member 202, the radial bearing surfaces (regions where dynamic pressure grooves 208a1 and 208a2 of the inner peripheral surface 208a are formed) of the bearing sleeve 208 face the outer peripheral surface 202a1 of the shaft portion 202a through the intermediation of the radial bearing clearances. In accordance with the rotation of the shaft member 202, the lubricant oil in the radial bearing clearances is pressurized toward the axial center m of the dynamic pressure grooves 208a1 and 208a2, whereby the pressure thereof is increased. Owing to the dynamic pressure action of the dynamic pressure grooves 208a1 and 208a2, the first radial bearing portion R1 and the second radial bearing portion R2 are formed which radially support the shaft member 202 in a non-contact fashion.

Simultaneously, owing to the dynamic pressure action of the dynamic pressure grooves, an oil film of the lubricant oil are respectively formed in the thrust bearing clearances between the thrust bearing surface (region where dynamic pressure grooves 208c1 of lower end surface 208c are formed) of the bearing sleeve 208 and the upper end surface 202b1 of the flange portion 202b opposed thereto, and in the thrust bearing clearances between the thrust bearing surface (region where dynamic pressure grooves of upper end surface 207b1 are formed) of the housing 207 and the lower end surface 202b2 of the flange portion 202b opposed thereto. Further, owing to the pressures of the oil film, the first thrust bearing portion T1 and the second thrust bearing portion T2 are formed which support in a thrust direction the shaft member 202 in a non-contact fashion.

Further, the thrust bearing clearances of the thrust bearing portions T1 and T2 positioned inside the housing 207 at the lower end thereof and the seal space S formed on the opening side of the housing 207 are communicated with each other through an intermediation of a fluid path 210a constituted by means of a step portion 207d of the housing 207 and the lower end surface 208c of the bearing sleeve 208, a fluid path 210b constituted by means of the axial grooves 208e formed in the outer peripheral surface 208b of the bearing sleeve 208, and a fluid path 210c constituted by means of the lower end surface 209b of the seal portion 209 and the upper end surface 208d of the bearing sleeve 208. With this structure, for example, it is possible to prevent an excessive increase in pressure of the fluid (lubricant oil) on the thrust bearing portions T1 and T2 side or decrease therein for some reason or other, to thereby stably support in a thrust direction the shaft member 202 in a non-contact fashion.

Further, in this embodiment, the dynamic pressure grooves 208a1 of the first radial bearing portion R1 are formed asymmetrically in the axial direction with respect to the axial center m (refer to FIG. 19). During rotation of the shaft member 202, a drawing-in force (pumping force) to the lubricant oil due to the dynamic pressure grooves 208a1 is relatively large in the upper region as compared with the lower region. Further, due to this difference in drawing-in force, the lubricant oil filling the gap between the inner peripheral surface 208a of the bearing sleeve 208 and the outer peripheral surface 202a1 of the shaft portion 202a flows downwards, and circulates through the route: the thrust bearing clearance of the first thrust bearing portion T1→the fluid path 210a the fluid path 210b→the fluid path 210c before being drawn into the radial bearing clearance of the first radial bearing portion R1 again. In this way, the lubricant oil flows and circulates through the inner spaces of the housing 207, whereby it is possible to maintain the right balance in pressures inside the bearing. As a result, it is possible to prevent generation of bubbles in accordance with generation of negative pressure in the lubricant oil, to thereby solve the problems such as occurrence of leakage of the lubricant oil and generation of vibration in accordance therewith.

The present invention is not limited to the above embodiments. Note that, in the following description, the parts having the same function as those in the above embodiments are denoted by the same reference symbols, and the description thereof is omitted.

In a fluid dynamic bearing device 221 illustrated in FIG. 21, the side portion 207a of the housing 207 and the bearing sleeve 208 are integrally formed with each other by means of a resin. The integrally-molded product thus obtained constitutes the outer member A. The lower end opening of the outer member A is closed by means of the bottom portion 207b separately formed. On the outer peripheral surface 202a1 of the shaft member 202 serving as the inner member C, the dynamic pressure grooves 202c1 and 202c2 of a herringbone-like configuration are formed in the two regions separated from each other in the axial direction. The inner peripheral surface 208a of the outer member A faces the radial bearing clearance, and the circular groove 211 serving as a circumferential recessed portion is formed in the portion facing the axial region between the radial bearing portions R1 and R2. Similarly to the above embodiment, the circular groove 211 is molded simultaneously with the outer member A. During rotation of the shaft member 202, the circular groove 211 functions as a play, to thereby reduce the rotational torque of the shaft member 202. Simultaneously, the circular groove 211 functions as an oil pool for supplying the oil to the radial bearing clearances, to thereby increase lubricity between the shaft member 202 and the outer member A.

In the above embodiments, there is illustrated the case where the circular groove 211 of a rectangular sectional configuration is formed as a circumferential recessed portion formed in the inner peripheral surface of the outer member A. However, the configuration of the recessed portion is not limited thereto. For example, as the recessed portion, a circular groove of a sectional semicircular configuration or a plurality of circular arc grooves circumferentially separated from each other may be formed.

Further, in the above embodiments, a circumferential recessed portion is formed by means of the circular member 214 formed of a material which can be dissolved in a particular solvent. However, the present invention is not limited thereto. For example, it is possible to mold the outer member A through insertion of a plurality of dividable metal circular arc members so as to divide, after the integrally-molded product thus obtained is taken out of the die, the circular arc members for the sake of being detached from the outer member A, to thereby form the recessed portion. Alternatively, it is also possible to form the circular member 214 by using an elastically deformable material, for example, a rubber-based material so as to be detached after insertion molding of the outer member A as described above, to thereby form the recessed portion.

Still further, the dynamic pressure generating portions described above may be provided on the surface opposed thereto through the intermediation of the bearing clearances. In addition, the configuration of the dynamic pressure generating portions is not limited to the above. For example, it is possible to form, as the dynamic pressure generating portions of the radial bearing portion, dynamic pressure grooves of a spiral configuration, step bearings, multi-arc bearings, or circular arc bearings. Further, it is also possible to form, as the dynamic pressure generating portions of the thrust bearing portion, dynamic pressure grooves of a herringbone-like configuration, step bearings, or corrugated bearings.

Yet further, the outer peripheral surface 202a1 of the shaft member 202 and the inner peripheral surface 208a of the bearing sleeve 208, which face each other through the intermediation of the radial bearing clearances, can be formed as cylindrical surfaces, to thereby constitute a complete round bearing. In addition, it is possible to adopt so-called pivot bearing as the thrust bearing portions.

Yet further, as the lubricant fluid filling inside the bearing, the lubricant oil is used in the above description. However, the lubricant fluid is not limited thereto. For example, the lubricant grease or magnetic fluid may be used.

Yet further, the dynamic pressure bearing devices 201 and 221 may be applied not only to a spindle motor but also other motors such as a fan motor.

Note that, the embodiments of the present invention are not limited to the above. For example, it is possible to appropriately combine the structures described above of a fluid dynamic bearing device according to the first, second, and third embodiments of the present invention with one another.

Figure 1:
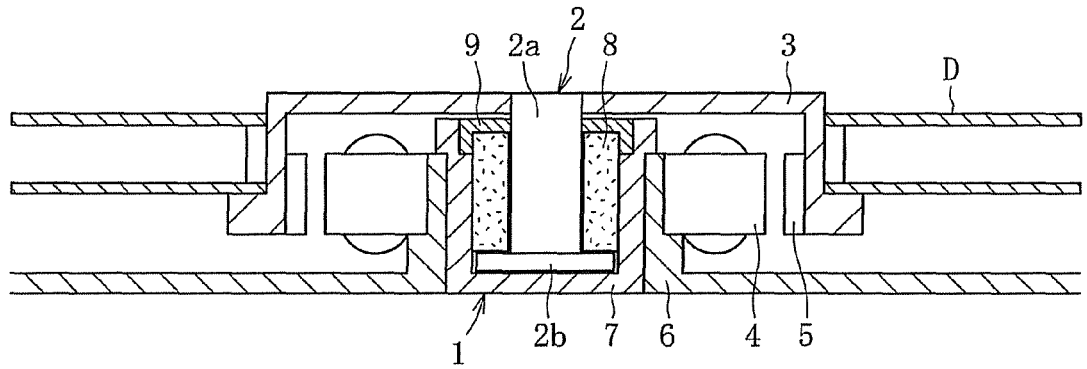
FIG. 1 is a sectional view of a spindle motor for an HDD, with a fluid dynamic bearing device according to the present invention incorporated therein.
Figure 2:
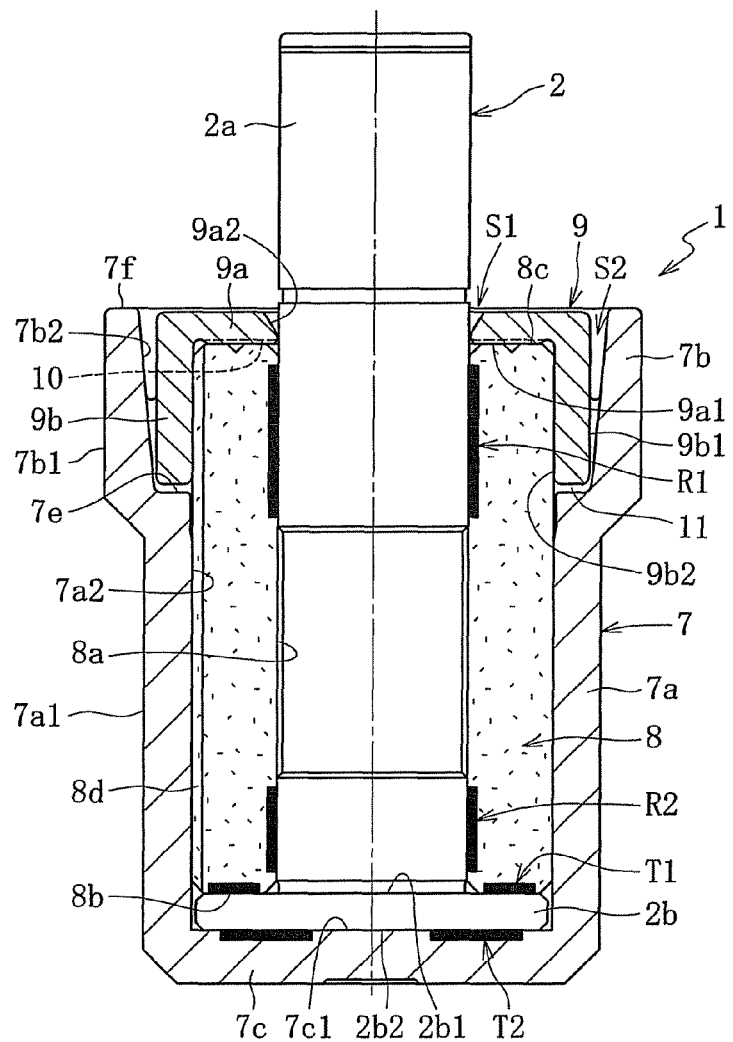
FIG. 2 is a sectional view of a fluid dynamic bearing device according to a first embodiment of the present invention.
Figure 3:
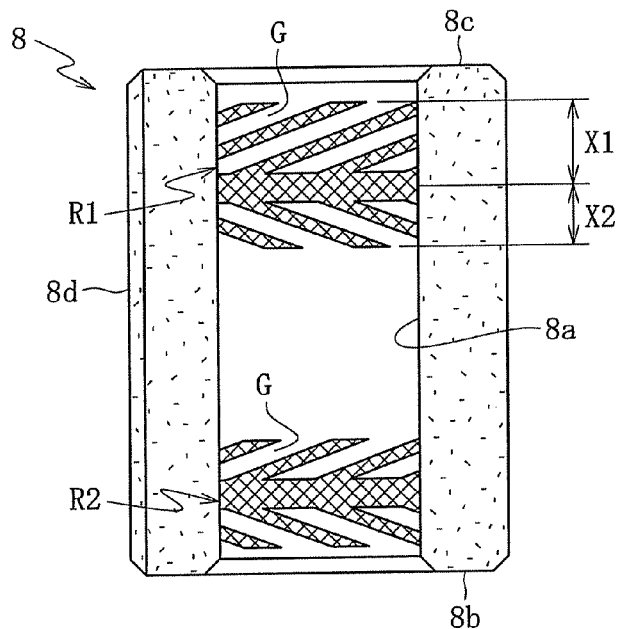
FIG. 3 is a sectional view of a bearing sleeve.
Figure 4:
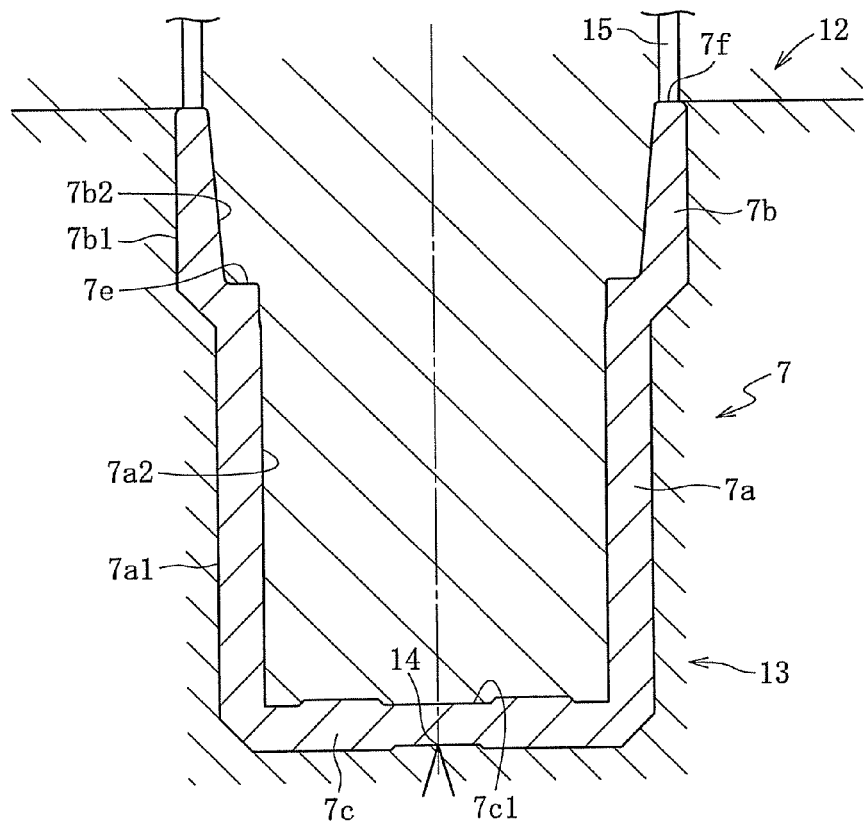
FIG. 4 is a sectional view illustrating an injection molding process of a housing.
Figure 5:
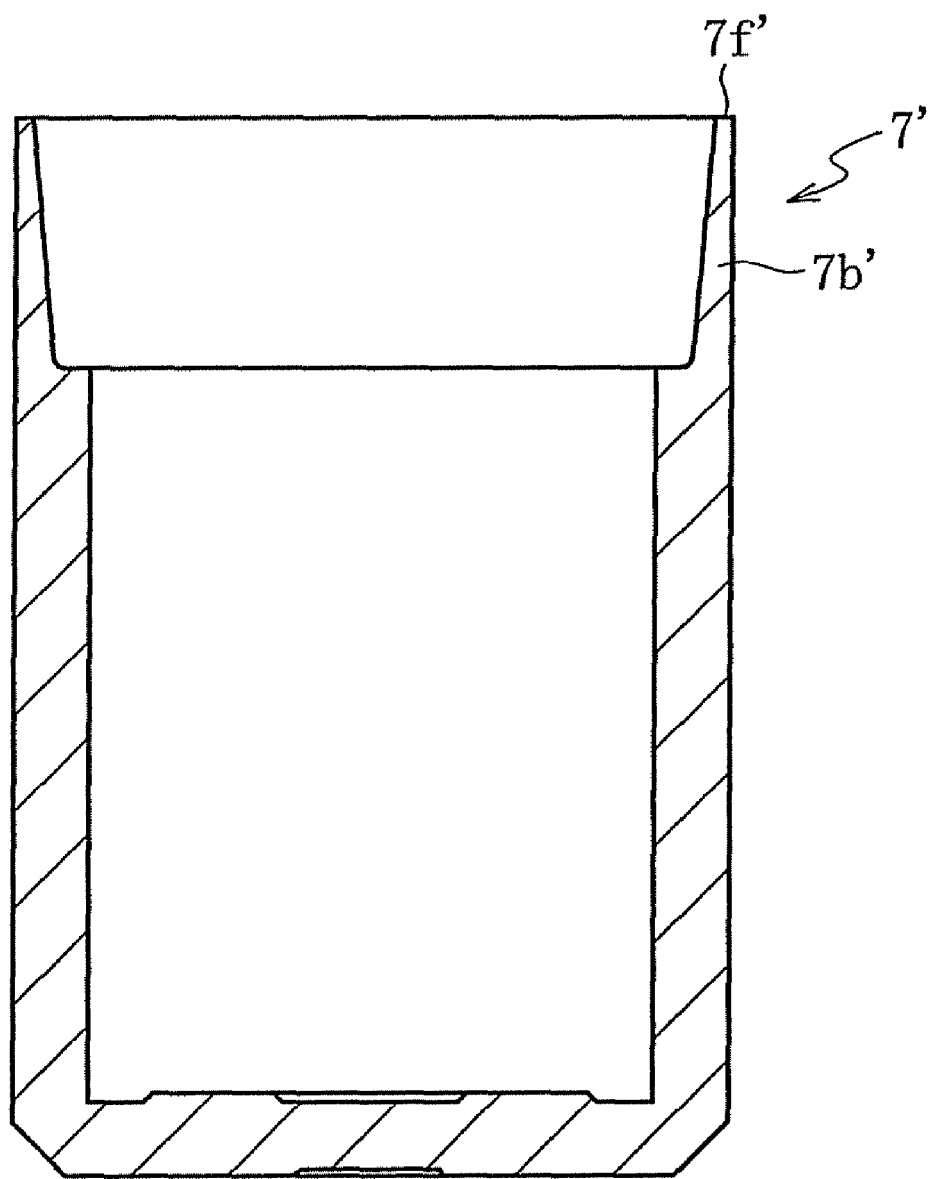
FIG. 5 is a sectional view of a housing of a comparative example.
Figure 6:
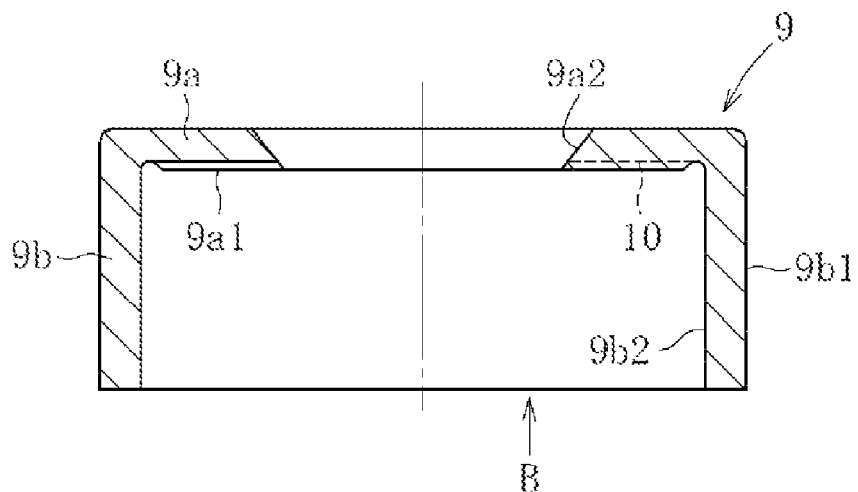
FIG. 6 is a sectional view of a seal member taken along the line VI-VI (refer to FIG. 7).
Figure 7:
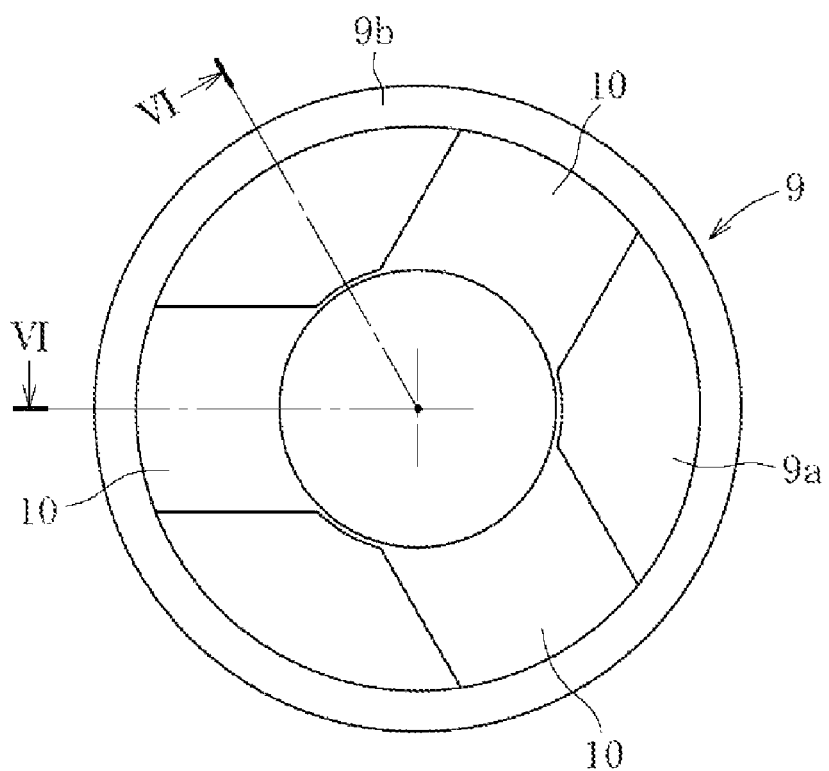
FIG. 7 is a plan view of the seal member as seen in a direction of the arrow B (refer to FIG. 6).
Figure 8:
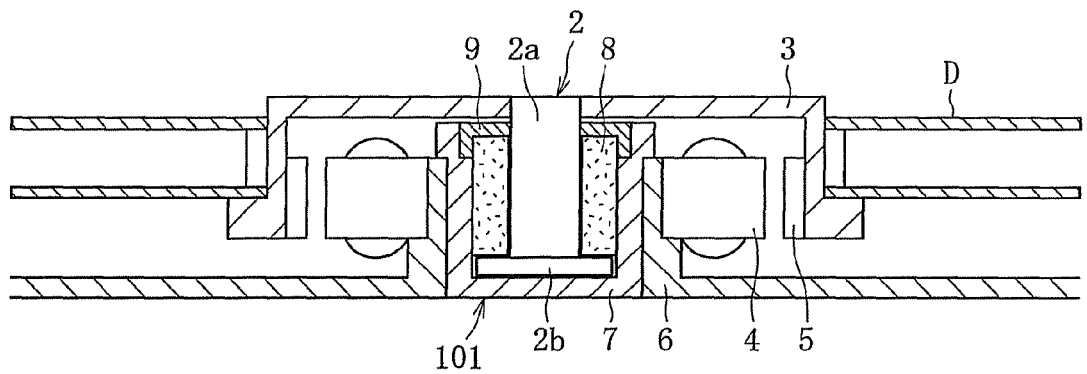
FIG. 8 is a sectional view of a spindle motor for an information apparatus, with a fluid dynamic bearing device according to the present invention incorporated therein.
Figure 9:
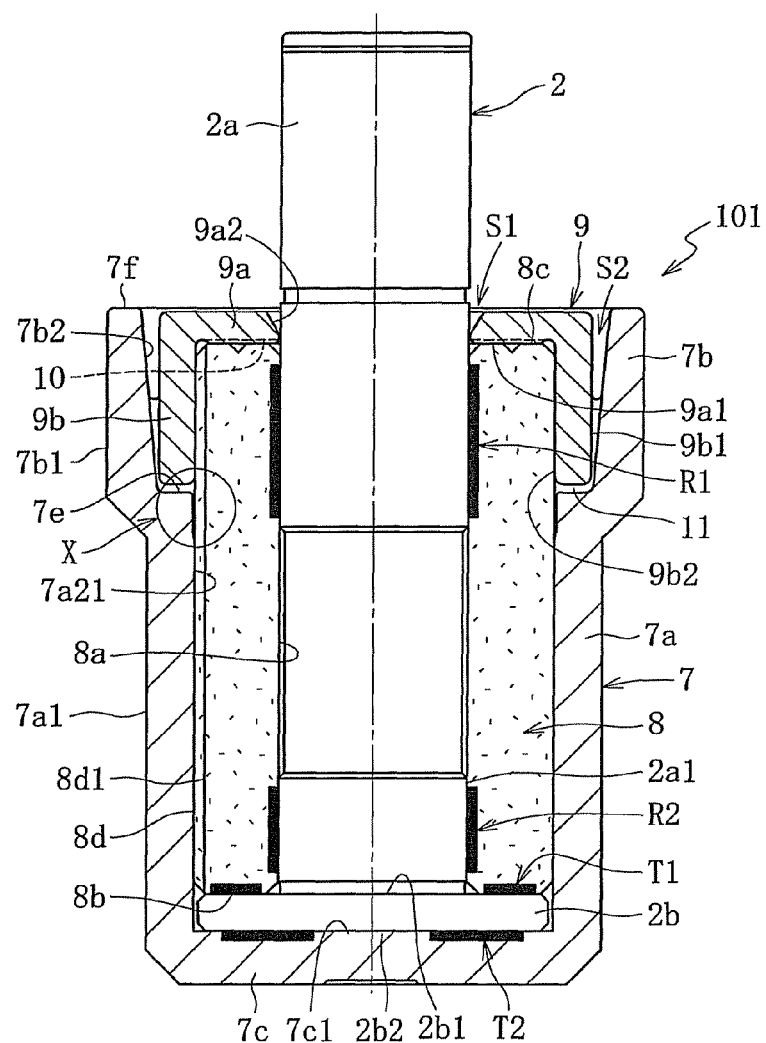
FIG. 9 is a sectional view of a fluid dynamic bearing device according to a second embodiment of the present invention.
Figure 10:
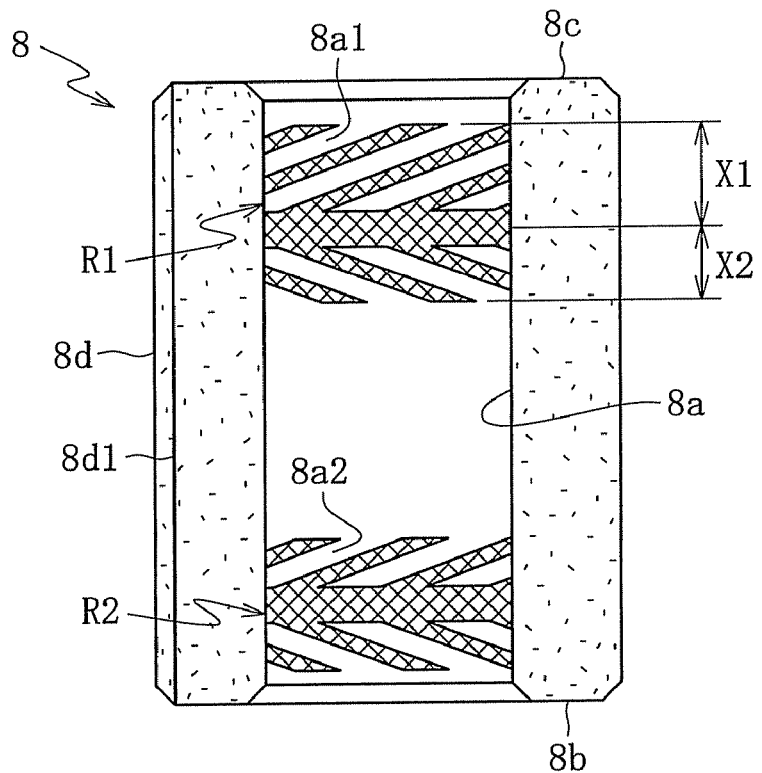
FIG. 10 is a sectional view of a bearing sleeve.
Figure 11:
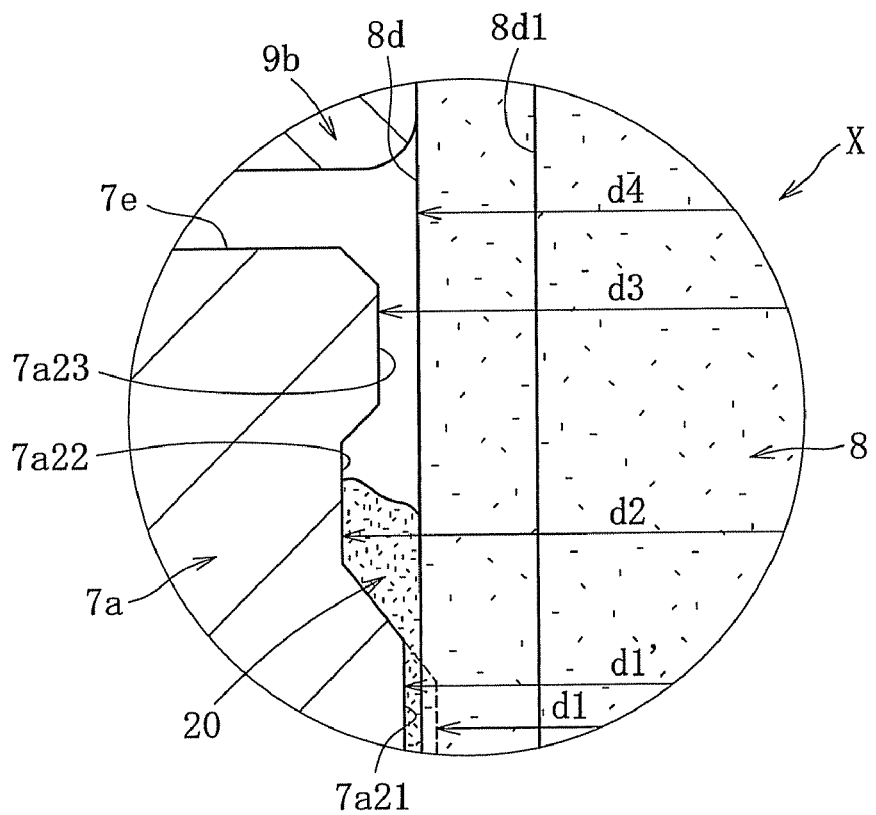
FIG. 11 is an enlarged sectional view of the portion X of FIG. 9.
Figure 12:
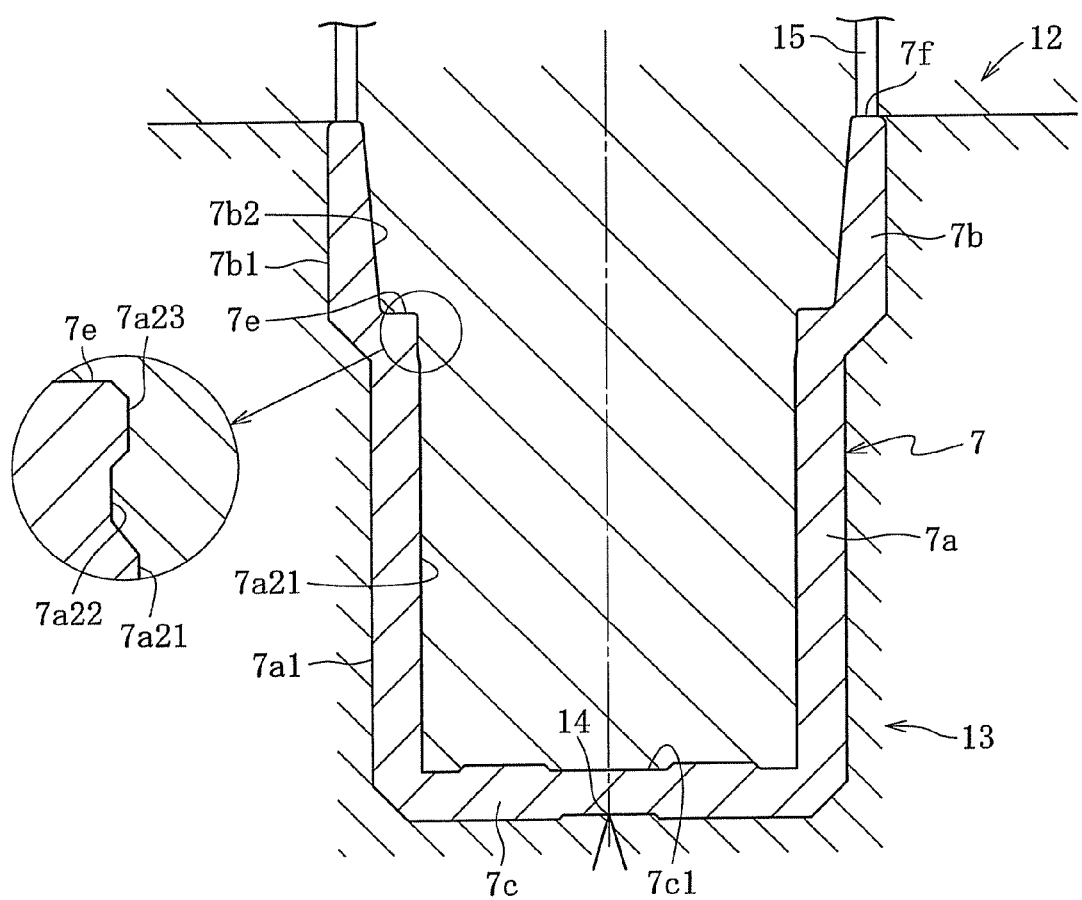
FIG. 12 is a sectional view illustrating an injection molding process of a housing.
Figure 13:
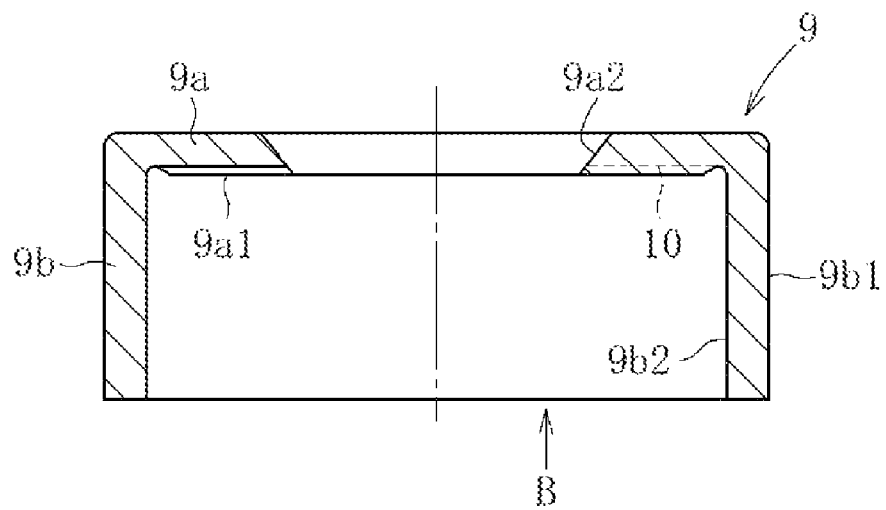
FIG. 13 is a sectional view of a seal member taken along the line XIII-XIII (refer to FIG. 14).
Figure 14:
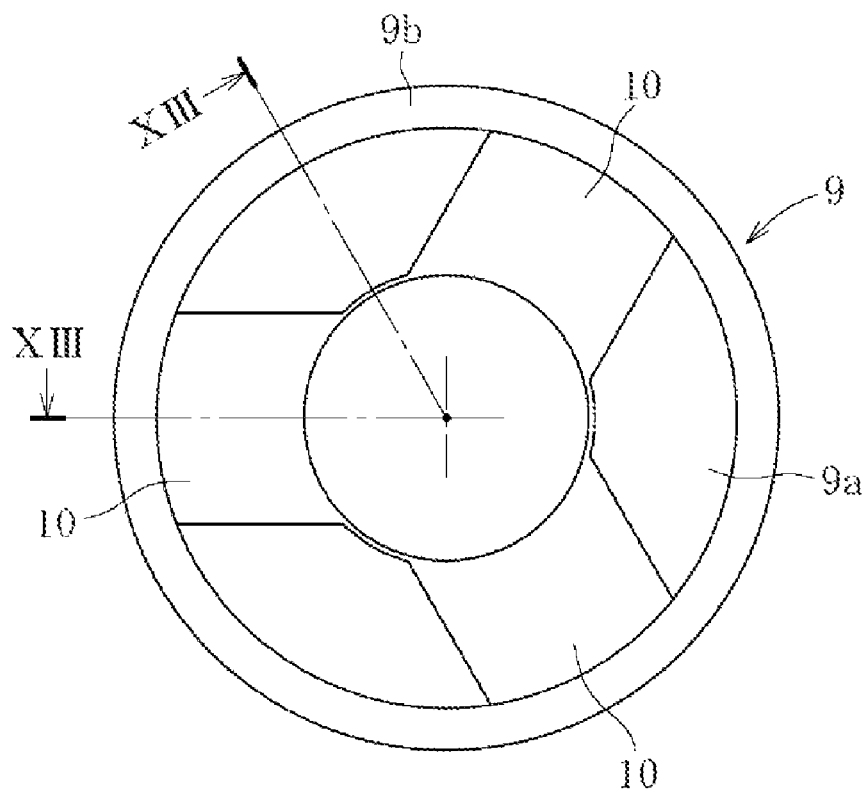
FIG. 14 is a plan view of the seal member as seen in a direction of the arrow B (refer to FIG. 13).
Figure 15:
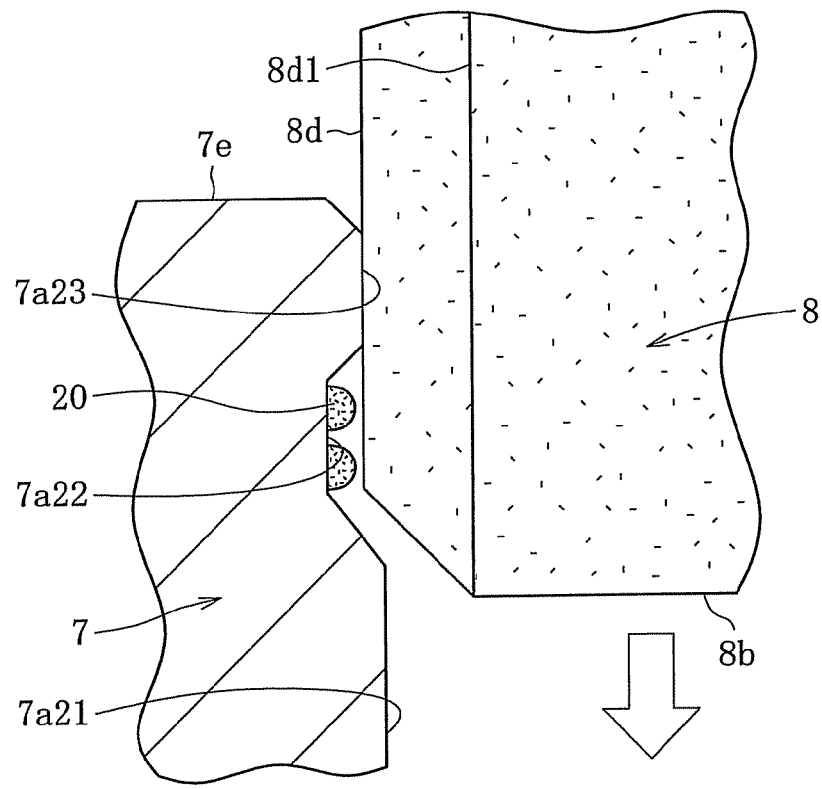
FIG. 15 is an enlarged sectional view of a main portion upon attachment of the bearing sleeve to the housing.
Figure 16:
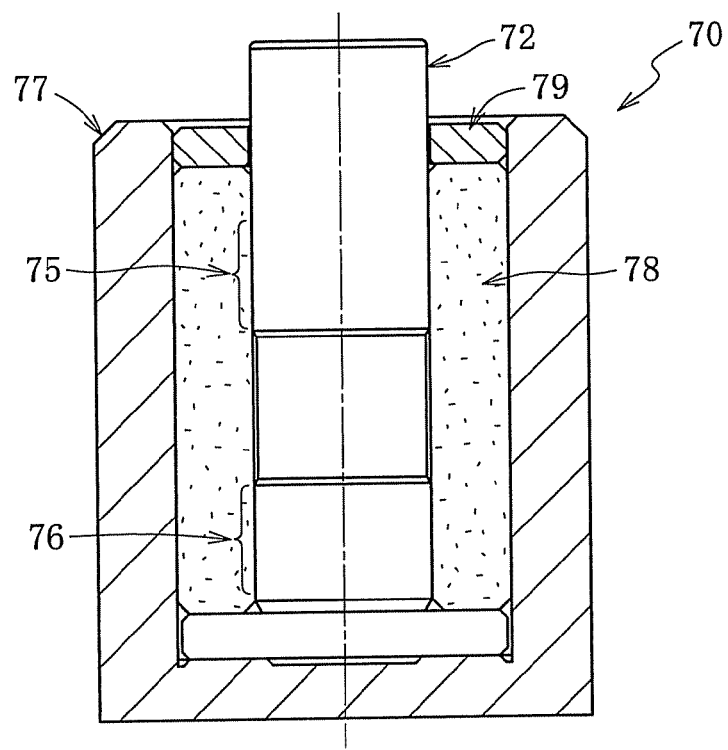
FIG. 16 is a sectional view of a well-known fluid dynamic bearing device.
Figure 17:
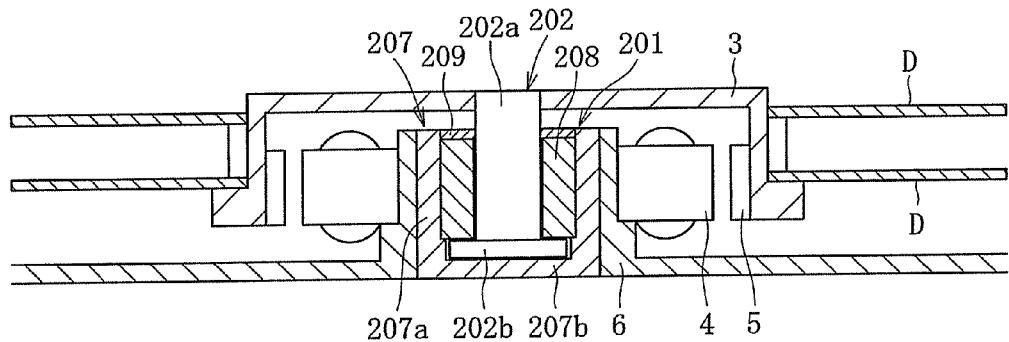
FIG. 17 is a sectional view of a spindle motor with a fluid dynamic bearing device according to the present invention incorporated therein.
Figure 18:
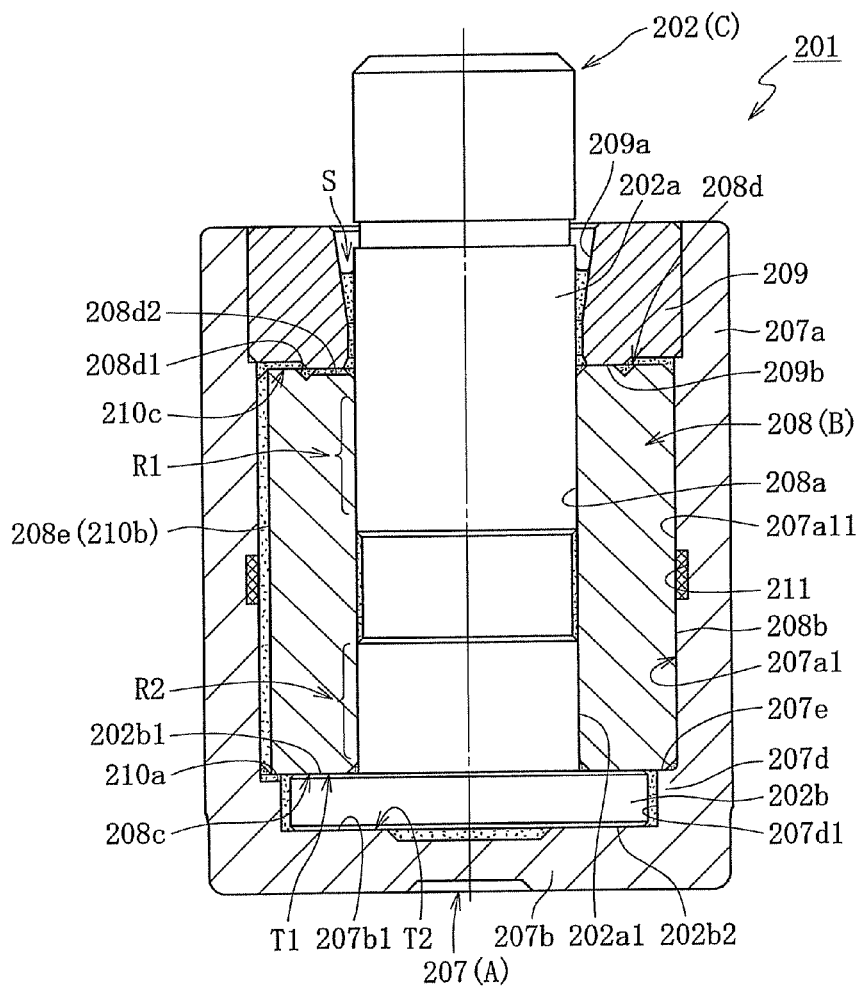
FIG. 18 is a sectional view of a fluid dynamic bearing device according to a third embodiment of the present invention.
Figure 19A:
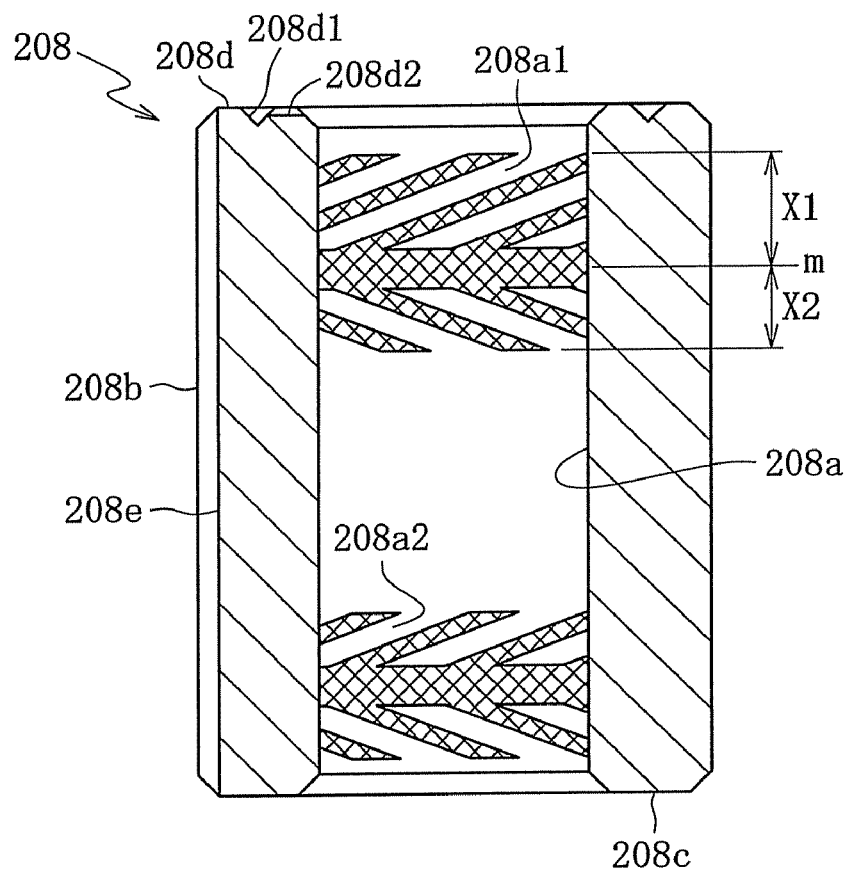
FIG. 19(a) is a sectional view of the bearing sleeve.
Figure 19B:
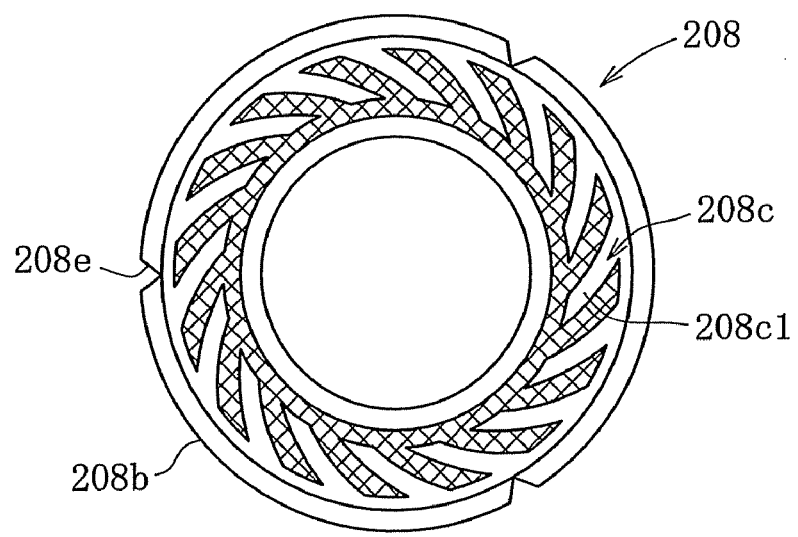
FIG. 19(b) is a bottom view thereof.
Figure 20A:
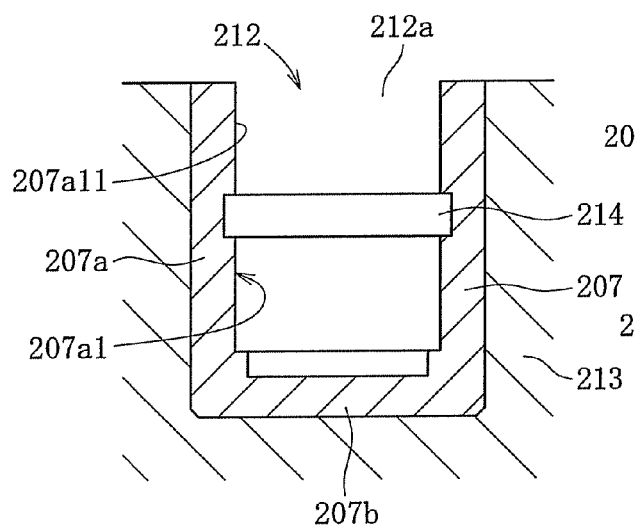
FIGS. 20(a) through 20(c) are sectional views each illustrating a molding process of an outer member (housing).
Figure 20B:
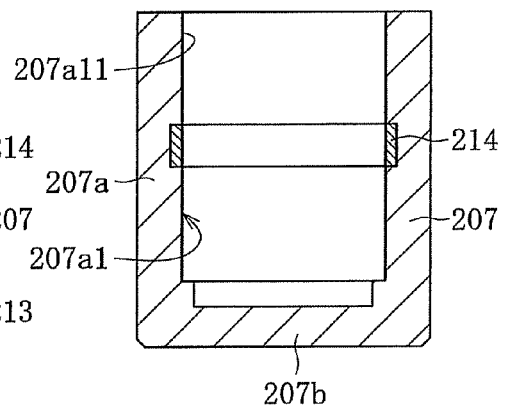
Figure 20C:
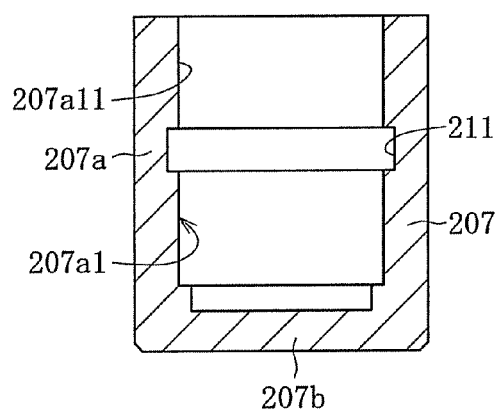
Figure 21:
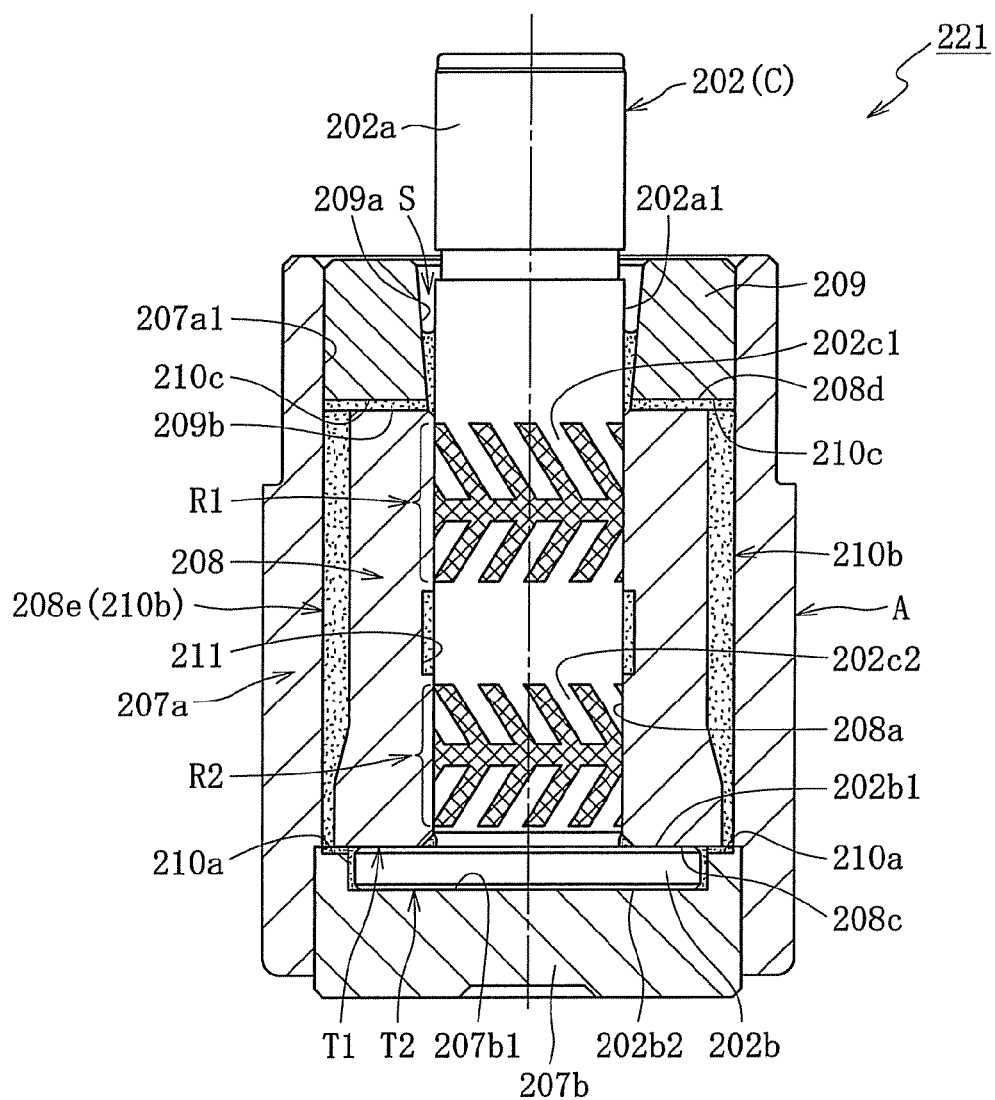
FIG. 21 is a sectional view of a fluid dynamic bearing device according to another embodiment of the present invention.

DESCRIPTION OF REFERENCE SYMBOLS 1 fluid dynamic bearing device (fluid dynamic pressure bearing device)
2 shaft member
3 hub
4 stator coil
5 rotor magnet
6 bracket
7 housing
7a small diameter portion
7a1 small diameter outer peripheral surface
7b large diameter portion
7b1 large diameter outer peripheral surface
7c bottom portion
7f thrusting surface
8 bearing sleeve
9 seal member
9a first seal portion
9b second seal portion
10 circulation groove
12 male die
13 female die
14 gate
R1 first radial bearing portion
R2 second radial bearing portion
S1 first seal space
S2 second seal space
T1 first thrust bearing portion
T2 second thrust bearing portion

The invention claimed is:

1. A fluid dynamic bearing device, comprising:
a radial bearing portion for rotatably supporting a shaft member through an oil film formed in a radial bearing clearance;
a housing for accommodating the radial bearing portion therein, the housing is formed through injection molding of a resin;
a lubricant oil filling an inner space of the housing;
a seal member for sealing an opening of the housing;
a first seal space is formed on an inner peripheral surface of the seal member; and
a second seal space is formed on an outer peripheral surface of the seal member,
wherein the housing has a small diameter portion and a large diameter portion, an outer peripheral surface of the large diameter portion having a diameter larger than a diameter of an outer peripheral surface of the small diameter portion, an inner peripheral surface of the large diameter portion having a diameter larger than a diameter of an inner peripheral surface of the small diameter portion,
wherein the second seal space is formed between the outer peripheral surface of the seal member and the large diameter inner peripheral surface of the housing, and
wherein the second seal space has the lubricant oil drawn therein due to a capillary force so as to seal the opening of the housing.

2. A fluid dynamic bearing device according to claim 1, wherein a thrusting surface for receiving a thrusting force of a thrusting mechanism is formed on an end surface of an opening side of the housing.

3. A fluid dynamic bearing device according to claim 2, wherein a large diameter outer peripheral surface and a small diameter outer peripheral surface are provided on an outer peripheral surface of the housing, the large diameter outer peripheral surface being arranged on an outer diameter side of the seal member.

4. A fluid dynamic bearing device according to claim 1, wherein a large diameter outer peripheral surface and a small diameter outer peripheral surface are provided on an outer peripheral surface of the housing, the large diameter outer peripheral surface being arranged on an outer diameter side of the seal member.

5. A fluid dynamic bearing device according to claim 4, wherein the bearing sleeve is fixed along an inner periphery of the housing,
the radial bearing clearance is formed between the bearing sleeve and the shaft member, the housing has
- a bottomed cylindrical shape,
- a first inner peripheral surface to which the bearing sleeve is bonded in a press-fitting manner on an inner diameter side thereof,
- a second inner peripheral surface which is provided on an opening side with respect to the first inner peripheral surface, and to which the bearing sleeve is bonded through an intermediation of the gaps on the inner diameter side thereof, and
- a third inner peripheral surface which is provided on the opening side with respect to the second inner peripheral surface, and which has a diameter smaller than a diameter of the second inner peripheral surface and larger than an outer diameter of the bearing sleeve.

6. A fluid dynamic bearing device according to claim 1, wherein the bearing sleeve is fixed along an inner periphery of the housing,
the radial bearing clearance is formed between the bearing sleeve and the shaft member,
the housing has
- a bottomed cylindrical shape,
- a first inner peripheral surface to which the bearing sleeve is bonded in a press-fitting manner on an inner diameter side thereof,
- a second inner peripheral surface which is provided on an opening side with respect to the first inner peripheral surface, and to which the bearing sleeve is bonded through an intermediation of the gaps on the inner diameter side thereof, and
- a third inner peripheral surface which is provided on the opening side with respect to the second inner peripheral surface, and which has a diameter smaller than a diameter of the second inner peripheral surface and larger than an outer diameter of the bearing sleeve.

7. A fluid dynamic bearing device according to claim 6, wherein the housing is formed through injection molding of a resin.

8. A fluid dynamic bearing device according to claim 7, further comprising the seal member for sealing the opening of the housing, wherein:
the first seal space is formed on an inner peripheral side of the seal member; and
the second seal space is formed on an outer peripheral side of the seal member.

9. A fluid dynamic bearing device according to claim 6, further comprising the seal member for sealing the opening of the housing, wherein:
the first seal space is formed on an inner peripheral side of the seal member; and
the second seal space is formed on an outer peripheral side of the seal member.

10. A fluid dynamic bearing device according to claim 1, wherein the housing has an inner peripheral surface to which a bearing sleeve is fixed, the bearing sleeve having an inner peripheral surface facing the radial bearing clearance, and which is provided with a recessed portion formed of a molded surface in a circumferential direction.

11. A fluid dynamic bearing device according to claim 1, wherein the housing has an inner periphery along which a bearing sleeve is integrally provided, the integrally-molded product having an inner peripheral surface which faces the radial bearing clearance and which is provided with a recessed portion formed of a molded surface in a circumferential direction.

12. A fluid dynamic bearing device, comprising:
- a radial bearing portion for rotatably supporting a shaft member through an oil film formed in a radial bearing clearance;
- a housing for accommodating the radial bearing portion therein;
- a lubricant oil filling an inner space of the housing;
- a seal member for sealing an opening of the housing, the seal member is formed through injection molding of a resin; the seal member comprising:
  - a first seal portion formed in a disc shape having an inner peripheral surface inside of which a first seal space is formed; and
  - a second seal portion formed in a cylindrical shape whose wall protruding in an axial direction from an outer periphery of the first seal portion and having an outer peripheral surface outside of which a second seal space is formed, wherein the second seal space has the lubricant oil drawn therein due to a capillary force so as to seal the opening of the housing, and
wherein the second seal portion is formed continuously in whole circumference of the seal member.

13. A fluid dynamic bearing device according to claim 12, wherein
a circulation groove formed on the one end surface of a first seal portion.

* * * * *